United States Patent
Teeter et al.

(10) Patent No.: US 10,203,737 B2
(45) Date of Patent: *Feb. 12, 2019

(54) POWER DISTRIBUTION BETWEEN MULTIPLE POWERING DEVICES AND POWERED DEVICE(S)

(71) Applicant: Dell Products L.P., Round Rock, TX (US)

(72) Inventors: Victor B. Teeter, Round Rock, TX (US); Andrew Berry, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/294,397

(22) Filed: Oct. 14, 2016

(65) Prior Publication Data

US 2017/0031406 A1 Feb. 2, 2017

Related U.S. Application Data

(63) Continuation-in-part of application No. 14/178,102, filed on Feb. 11, 2014, now Pat. No. 9,690,343.

(51) Int. Cl.
G06F 1/26 (2006.01)
G06F 1/28 (2006.01)
H04L 12/10 (2006.01)

(52) U.S. Cl.
CPC .............. *G06F 1/28* (2013.01); *G06F 1/266* (2013.01); *H04L 12/10* (2013.01)

(58) Field of Classification Search
CPC .................................. G06F 1/266; H02J 1/10
See application file for complete search history.

(56) References Cited

U.S. PATENT DOCUMENTS

| 7,966,502 | B2 | 6/2011 | Diab et al. |
| 8,247,927 | B2 | 8/2012 | Togawa |
| 8,261,001 | B2 | 9/2012 | Bobrek |
| 8,676,393 | B1 * | 3/2014 | Hupton ..................... H02J 3/14 307/24 |
| 2005/0201306 | A1 | 9/2005 | Engel |
| 2006/0273661 | A1 | 12/2006 | Toebes et al. |
| 2007/0081553 | A1 | 4/2007 | Cicchetti et al. |
| 2009/0031152 | A1 | 1/2009 | Bolderl-Ermel et al. |
| 2009/0164805 | A1 | 6/2009 | Diab et al. |
| 2015/0227182 | A1 | 8/2015 | Teeter |

* cited by examiner

*Primary Examiner* — Albert Wang
(74) *Attorney, Agent, or Firm* — Haynes and Boone, LLP

(57) ABSTRACT

A power distribution system includes a chassis with a plurality of ports that include a first port configured to communicate with powering devices and a second port configured to communicate with powered devices. A power distribution engine in the chassis is coupled to each of the plurality of ports. The power distribution engine determines that power available to the power distribution engine is insufficient to power a first powered device that is coupled to the first port, requests power from a first powering device that is coupled to the second port, and provides power that is received through the second port from the first powering device to the first powered device through the first port. In an embodiment, the first powered device and the second powered device are switch IHSs, the first port is configured as a trunk port, and the second port is configured as an access port.

20 Claims, 12 Drawing Sheets

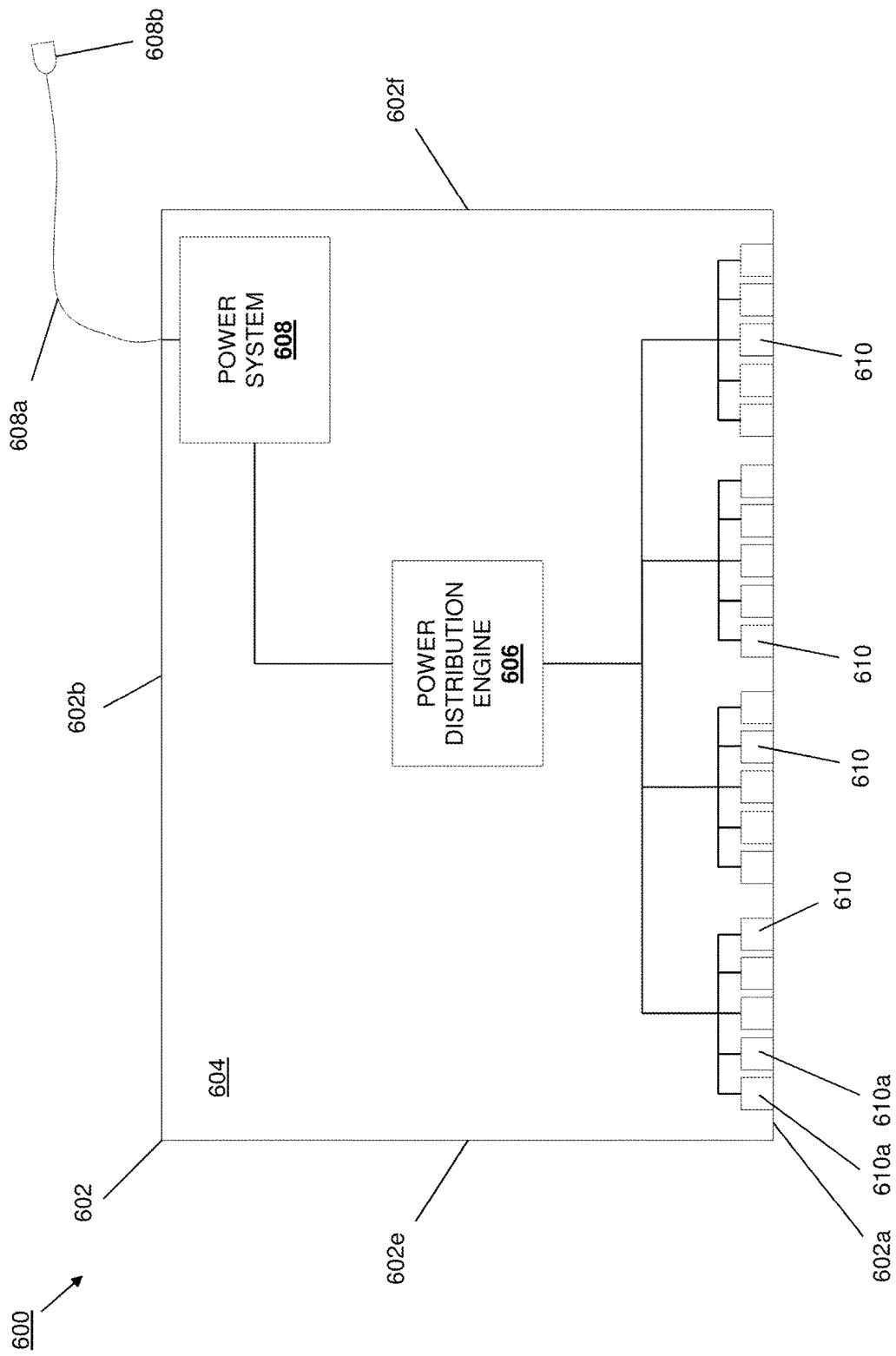

POWER DISTRIBUTION BETWEEN MULTIPLE POWERING DEVICES AND POWERED DEVICE(S)

CROSS REFERENCE TO RELATED APPLICATION

The present application is a Continuation-In-Part of U.S. patent application Ser. No. 14/178,102, filed Feb. 11, 2014, entitled "Power Distribution System," the disclosure of which is incorporated herein by reference in its entirety.

BACKGROUND

The present disclosure relates generally to information handling systems, and more particularly to a power distribution system for information handling systems As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Some IHSs such as, for example, Power over Ethernet (PoE) enabled IHSs are configured to provide power to other IHSs over the Ethernet cables that connect them. For example, PoE enabled switch IHSs may include a power system that couples to a power source such as a wall outlet, as well as to a PoE engine that is configured to provide power from the power source to powered IHSs connected to ports on the POE enabled switch IHS. However, such PoE enabled switch IHSs typically have a limited amount of power to distribute to their connected powered IHSs due to, for example, the need to use a majority of the power received by the power system from the power source to power the PoE enabled switch IHS and/or its components. When subject to a power usage spike, those PoE enabled switch IHSs may not have enough power for each of its connected powered IHSs.

Conventional solutions to this problem involved assigning a priority to each of the powered IHSs connected to a PoE enabled switch IHS, and providing power received by the power system from the power source to the powered IHSs based on their priorities. For example, a user of the PoE enabled switch IHS may assign a priority tag such as "critical", "high", and "low" to ports on the PoE enabled switch IHS that are connected to powered IHSs depending the importance of the operation of those powered IHSs to the user. When power is limited, or a powered IHS connected to a port on the PoE enabled switch that is assigned a higher priority needs more power, ports on the PoE enabled switch that are assigned a lower priority may be shut down, or have their supplied power reduced, in order to ensure that power is available to ports on the PoE enabled switch that are assigned a higher priority. However, such solutions lead to lower availability of powered IHSs, which can add cost associated with running the system, loss of data, and calls to technical support.

Accordingly, it would be desirable to provide an improved power distribution system.

SUMMARY

According to one embodiment, a power distribution system includes a chassis; a plurality of ports that are located on the chassis, wherein a first port of the plurality of ports is configured to communicate with powering devices, and wherein a second port of the plurality of ports is configured to communicate with powered devices; a power distribution engine that is included in the chassis and that is coupled to each of the plurality of ports, wherein the power distribution engine is configured to: determine that power available to the power distribution engine is insufficient to power a first powered device that is coupled to the first port; request power from a first powering device that is coupled to the second port; and provide power that is received through the second port from the first powering device to the first powered device through the first port.

BRIEF DESCRIPTION OF THE DRAWINGS

FIG. 2b is a schematic view illustrating an embodiment of the switch IHS of FIG. 2a.

FIG. 6b is a schematic view illustrating an embodiment of the powering device of FIG. 6a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
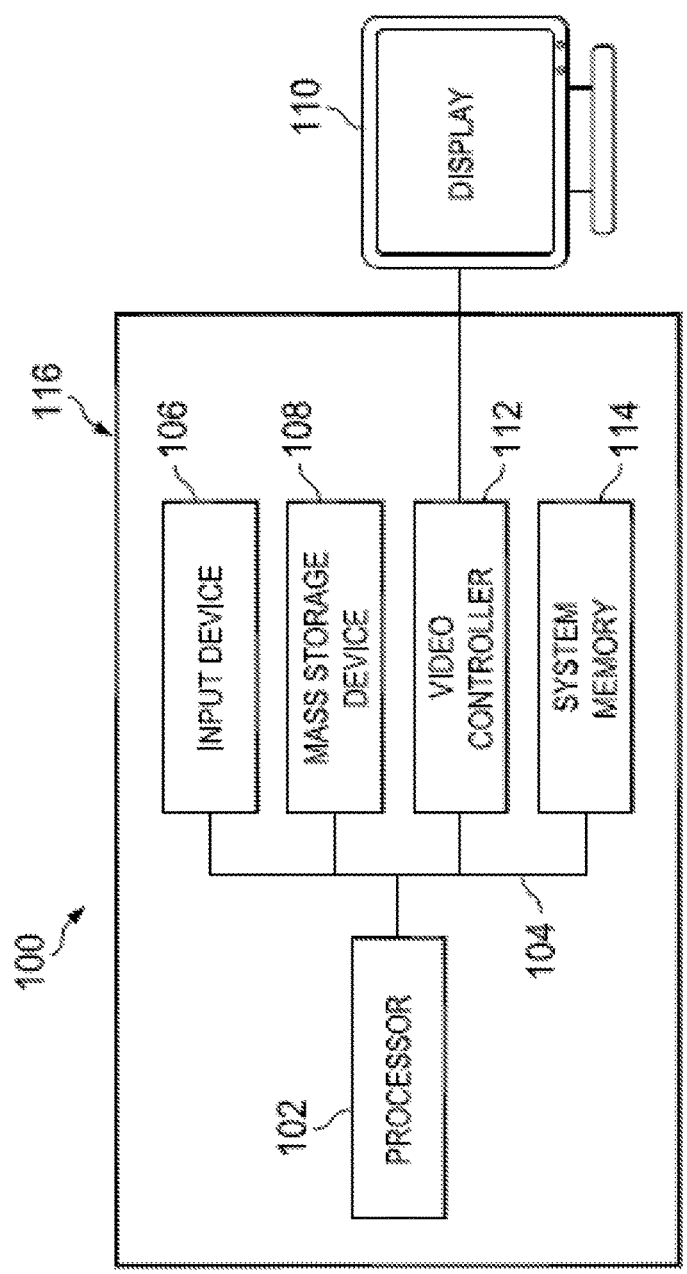
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2A:
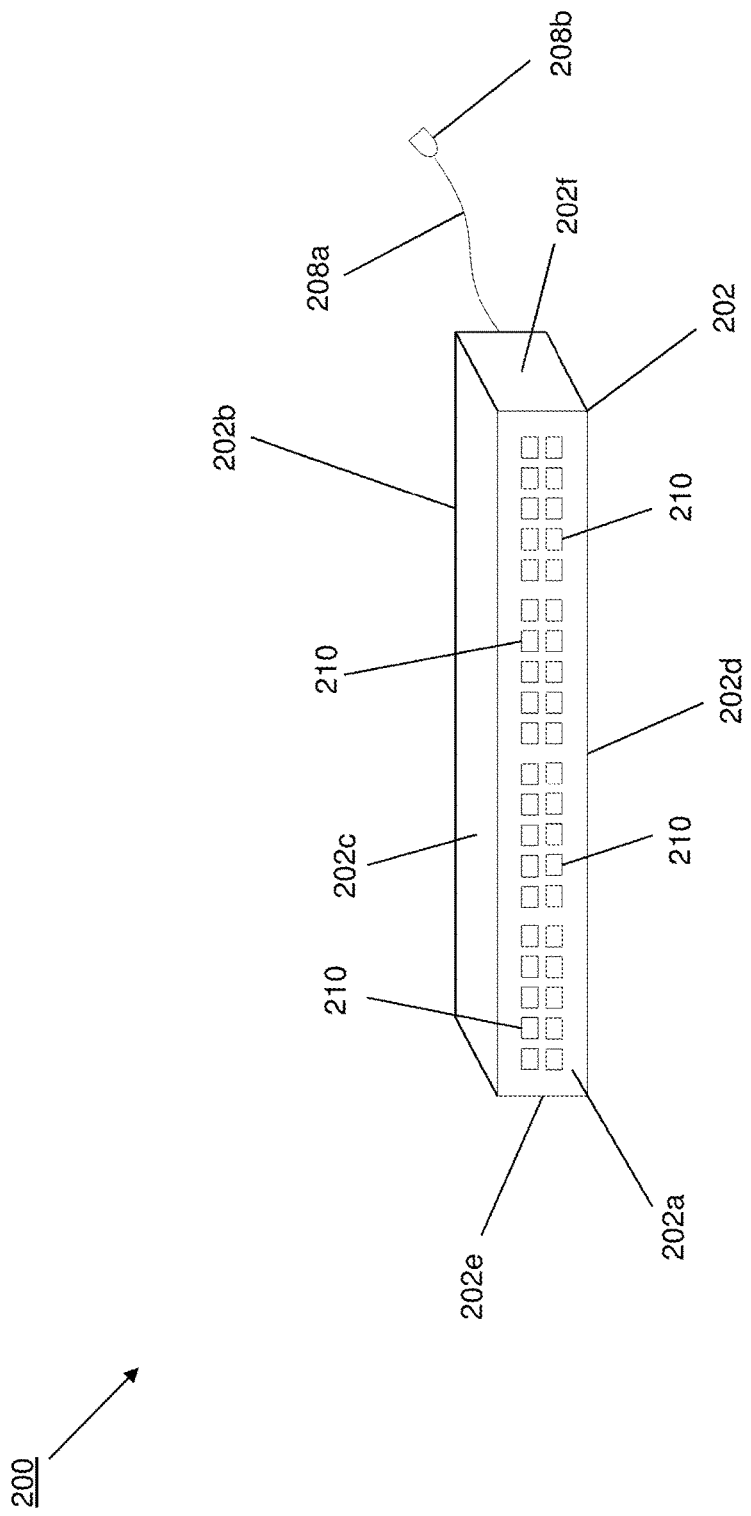
FIG. 2a is a front view illustrating an embodiment of a switch IHS.
Figure 2B:
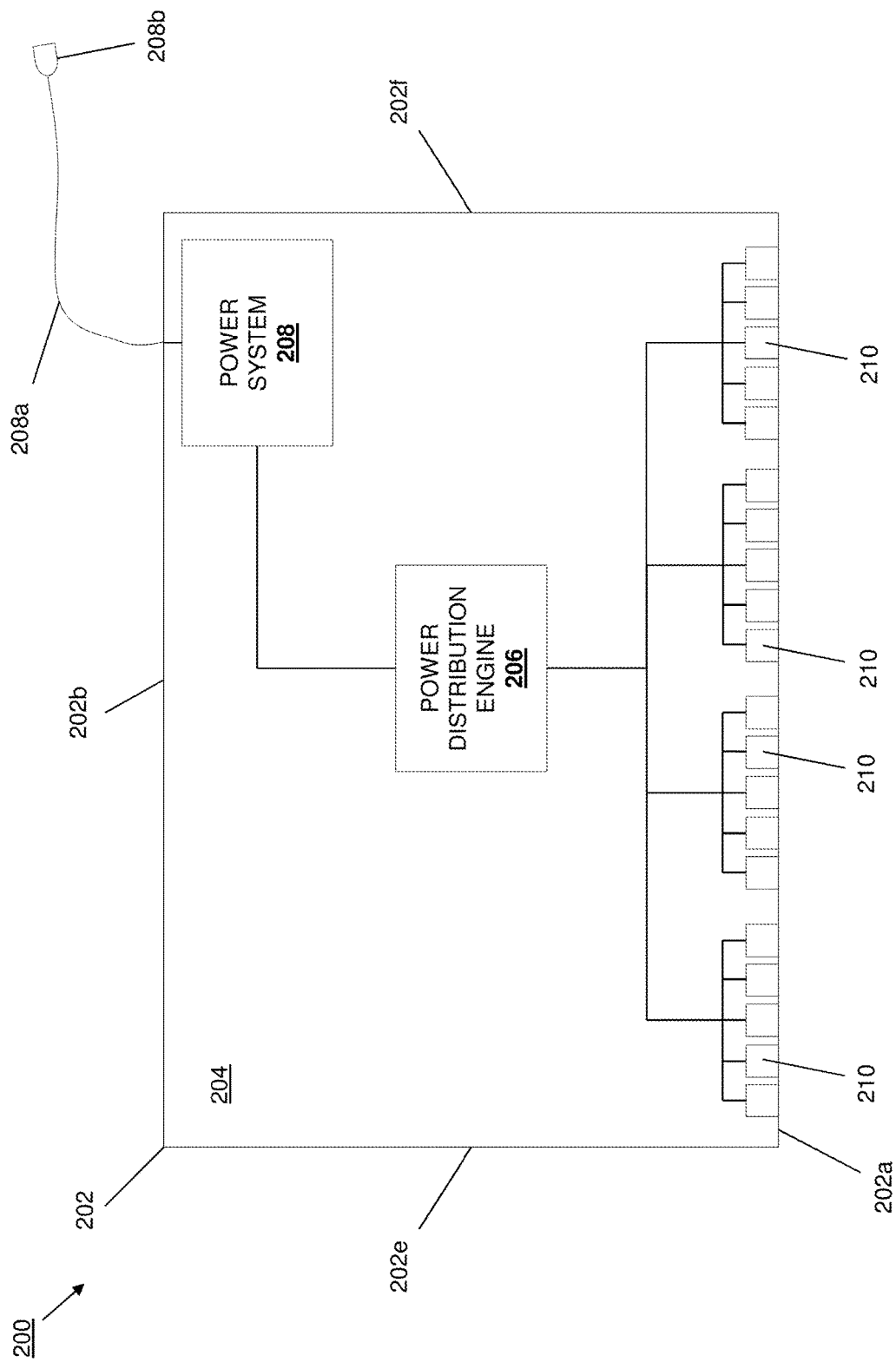

Referring now to FIGS. 2a and 2b, an embodiment of a powering device 200 is illustrated. In an embodiment, the powering device 200 may be the IHS 100, discussed above with reference to FIG. 1, and/or may include some or all of the components of the IHS 100. In the illustrated embodiment, the powering device 200 is a switch IHS. However, the powering device 200 may be a server IHS, a storage IHS, other types of networking IHSs, and/or a variety of other IHSs known in the art while remaining within the scope of the present disclosure. As discussed in further detail below, the powering device 200 is configured to provide power to one or more connected powered devices. For example, the powering device 200 may be a Power over Ethernet (PoE) enabled device, a PoE+ enabled device, a Universal PoE (UPoE) enabled device, and/or be enabled with a variety of other power provisioning technologies known in the art. As such, the powering device 200 may be configured to provide power over cables (e.g., Ethernet cables) to powered devices that are connected to those cables.

The powering device 200 includes a chassis 202 having a front surface 202a, a rear surface 202b that is located opposite the chassis 202 from the front surface 202a, a top surface 202c that extends between the front surface 202a and the rear surface 202b, a bottom surface 202d that is located opposite the chassis 202 from the top surface 202c and that extends between the front surface 202a and the rear surface 202b, and a pair of side surfaces 202e and 202f that are located opposite the chassis 202 from each other and that each extend between the front surface 202a, the rear surface 202b, the top surface 202c, and the bottom surface 202d. A chassis housing 204 is defined by the chassis 202 between the front surface 202a, the rear surface 202b, the top surface 202c, the bottom surface 202d, and the side surfaces 202e and 202f. In an embodiment, the powering device 200 may include a processing system (e.g., the processor 102 discussed above with reference to FIG. 1) that is located in the chassis housing 202 and that is coupled to a non-transitory memory system (e.g., the system memory 114 discussed above with reference to FIG. 1) that is located in the chassis housing 202 and that includes instruction that, when executed by the processing system, cause the processing system to provide a power distribution engine 206 that is configured to perform the functions of the power distributions engines discussed below.

In the illustrated embodiment, the power distribution engine 206 is coupled to a power system 208 (e.g., through the coupling of the processing system in the chassis housing 202 with the power system 208) that is located in the chassis housing 202 and that includes a power cable 208a that extends from the rear surface 202b of the chassis 202 and includes a power source connector 208b on its distal end. The power system 208 may be configured to receive power from a power source (e.g., through the power source connector 208b and power cable 208a), convert that power such that it may be used by components of the powering device 200, and/or provide a variety of other power system functions known in the art. However, in other embodiments, the power system 208 may be omitted and the power distribution engine 206 may operate to distribute power received through its ports from other powering devices, discussed in further detail below. The power distribution engine 206 is also coupled to a plurality of ports 210 that are located on the front surface 202a of the chassis 202. In an embodiment, any or all of the plurality of ports 210 may be configured to receive power from another powering device, provide power to another powering device, and/or provide power to a powered device. For example, any or all of the plurality of ports 210 may be PoE ports, PoE+ports, UPoE ports, and/or a variety of other power receiving and/or provisioning ports known in the art. One of skill in the art in possession of the present disclosure will recognize that, in some embodiments, all of the plurality of ports 210 may provision/receive power, while in other embodiments, some of the plurality of ports 210 may not provision/receive power. It should be understood that the powering device 200 may include a variety of other components (e.g., networking components, computing components, etc.) that have been omitted for clarity of illustration and discussion.

In the embodiments illustrated and described below, the powering device(s) 200 are switch IHSs, and the plurality of ports 210 may be configured by a user, administrator, or automatically as access ports for connection to powered devices, or as trunk pots for connection to powering devices (e.g., other switch IHSs in the embodiments illustrated and described below.) Furthermore, any subset of plurality of the ports 210 may be aggregated/grouped by configuring that subset as a Link Aggregation Group (LAG) or other aggregation/group known in the art. The details for configuring the ports 210 on the powering device 200 as access ports, trunk ports, or in a LAG should be understood by those of skill in the art and is not discussed herein in detail. However, one of skill in the art will recognize that the plurality of ports 210 may not be part of a switch IHS (e.g., they may be part of another type of IHS or powering device), and/or may not configured as access ports, trunk ports, or part of a LAG while remaining within the scope of the present disclosure. Thus, while the discussion and illustrations below focus on a plurality of switch IHS powering devices that are coupled together through ports that are configured as trunk ports, while also being coupled to powered devices through ports that are configured as access ports, and that operate to share power between each other through the trunk ports for provision to their respective powered devices through the access ports, other types of IHSs/powering devices having other types of ports are envisioned as falling within the scope of the present disclosure.

Figure 3:
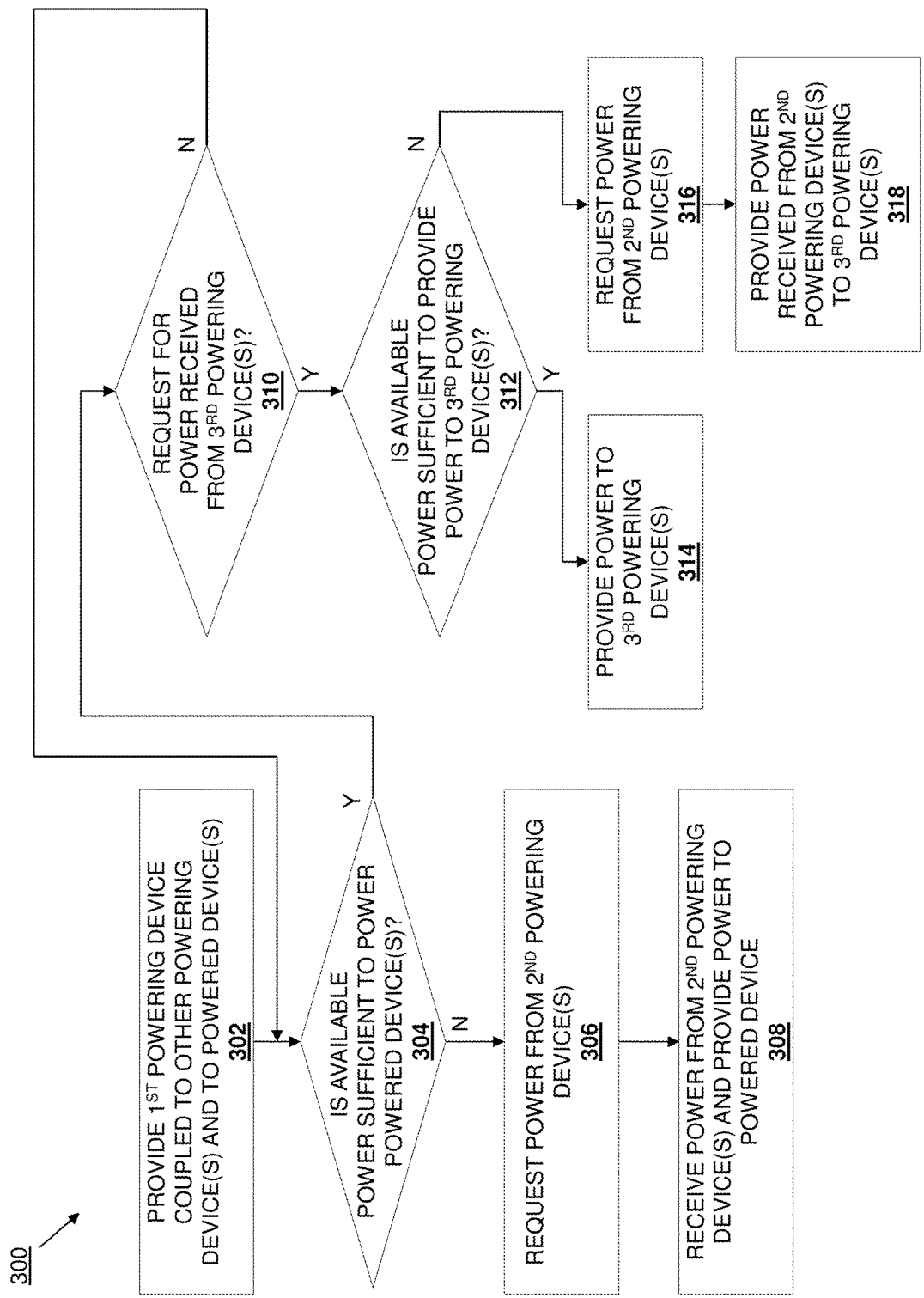
FIG. 3 is a flow chart illustrating an embodiment of a method for distributing power.
Figure 4:
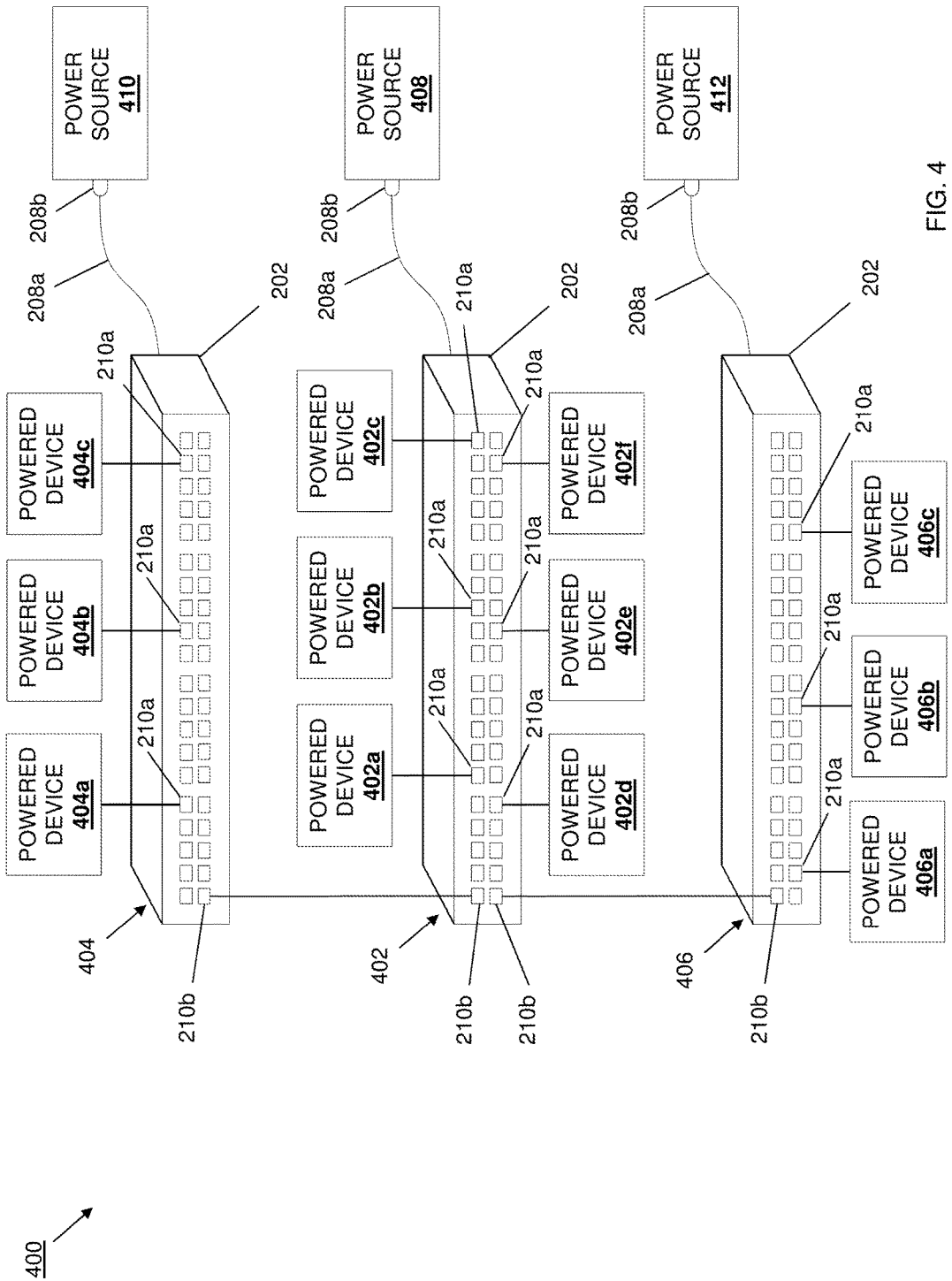
FIG. 4 is a schematic view illustrating an embodiment of a plurality of the switch IHSs of FIGS. 2a and 2b coupled to each other, powered devices, and power sources.

Referring now to FIGS. 3 and 4, an embodiment of a method 300 for distributing power is illustrated. The method 300 begins at block 302 where a first powering device is provided that is coupled to other power device(s) and to powered device(s). Referring to FIG. 4, an embodiment of an IHS 400 is illustrated that is provided during block 302 of the method 300. The IHS 400 includes a first powering device 402, a second powering device 404, and a third powering device 406. In the illustrated embodiment, each of the first powering device 402, the second powering device 404, and the third powering device 406 are substantially similar to the powering device 200 discussed above with reference to FIGS. 2a and 2b, and include the same reference numbers for similar components.

The power source connector 208b on the power cable 208a that extends from the first powering device 402 is coupled to a power source 408. A subset of the plurality of ports 210 on the first powering device 402 have been configured as access ports 210a, and are each coupled (e.g., via a cable such as an Ethernet cable) to a respective powered device 402a, 402b, 402c, 402d, 402e, and 402f. A subset of the plurality of ports 210 on the first powering device 402 have been configured as trunk ports 210b. Similarly, the power source connector 208b on the power cable 208a that extends from the second powering device 404 is coupled to a power source 410. A subset of the plurality of ports 210 on the second powering device 404 have been configured as access ports 210a, and are each coupled (e.g., via a cable such as an Ethernet cable) to a respective powered device 404a, 404b, and 404c. A subset of the plurality of ports 210 on the second powering device 404 have been configured as trunk ports 210b. Also similarly, the power source connector 208b on the power cable 208a that extends from the third powering device 406 is coupled to a power source 412. A subset of the plurality of ports 210 on the third powering device 406 have been configured as access ports 210a, and are each coupled (e.g., via a cable such as an Ethernet cable) to a respective powered device 406a, 406b, and 406c. A subset of the plurality of ports 210 on the third powering device 406 have been configured as trunk ports 210b.

In an embodiment, any of the powered devices 402a-f, 404a-c, and 406a-c may be wireless access points, cameras, phones, clocks, security access devices, remote sensors, remote monitoring devices, powered Bluetooth devices, radio frequency identification (RFID) readers, personal digital assistants (PDAs), laptop computers, and/or a variety of other powered devices known in the art. The power sources 408, 410, and 412 may be the same power source, different power sources, and combinations thereof, and may include, for example, power sources that may be connected to through a wall outlet (as illustrated), hardwired power sources, and/or a variety of other power sources known in the art. The first powering device 402 is coupled (e.g., via a cable such as an Ethernet cable) through one of its trunk ports 210b to a trunk port 210b on the second powering device 404. That first powering device 402 is also coupled (e.g., via a cable such as an Ethernet cable) through one of its trunk ports 210b to a trunk port 210b on the third powering device 406. While the illustrated example provides only three switch IHS powering devices coupled together through trunk ports, while being coupled to powered devices through access ports, and being coupled to power sources, more or fewer powering devices, other types of powering devices, more or fewer powered devices, more or fewer power sources, other types of couplings and coupling ports, and/or a wide variety of other modifications to the IHS 400 will provide systems that will benefit from the power distribution techniques discussed below and are envisioned as falling within the scope of the present disclosure.

The method 300 then proceeds to decision block 304 where the first powering device determines whether its available power is sufficient to power its powered device(s). While the examples provided below discuss power distribution in the IHS 400 from the "point of view" of the first powering device 402, any of the powering devices 402, 404, and/or 406 may operate according to the method 300 to distribute power substantially as discussed below for the first powering device 402. In an embodiment of block 304, the power distribution engine 206 in the first powering device 402 compares the power available through its power system 208 (e.g., via the connection of that power system 208 to the power source 408) to the current power consumption, power requirements, power requests, and/or other power needs of its connected powered devices 402a-f, and determines whether the power available from its power system 208 is sufficient to power each of its powered devices 402a-f.

In some embodiments, the power distribution engine 206 in the first powering device 402 may determine a power insufficiency amount that is the difference in the amount of power available from its power system 208 and the amount of power consumed, required, requested, or otherwise needed by its powered devices 402a-f. In other embodiments, the power distribution engine 206 in the first powering device 402 may simply determine that there is a power insufficiency (e.g., that one or more of the powered devices 402a-f is not receiving enough power, not operating optimally, and/or is otherwise power deficient) without quantifying that power insufficiency. In some embodiment, the determination that there is insufficient power at decision block 304 may include a real time determination of the current power situation (e.g., currently available power vs. current power consumption). In other embodiments, the determination that there is insufficient power at decision block 304 may include a prediction of a future power situation (e.g., expected power availability at a future time vs. predicted power consumption at that future time). While a few examples are provided, any methods for determining a power insufficiency from an available power are envisioned as falling within the scope of the present disclosure.

If, at decision block 304, the power distribution engine 206 in the first powering device 402 determines that the power available from the power system 208 is not sufficient to power one or more its powered devices 402a-f, the method 300 then proceeds to block 306 where the first powering device 402 requests power from second powering device(s). In an embodiment, the power distribution engine 206 in the first powering device 402 communicates, via its coupling with the second powering device 404 through their respective trunk ports 210b, a request for power from the second powering device 404. In some embodiments, the request for power at block 306 may be a request for the power insufficiency amount discussed above (e.g., an estimation of an amount of power needed to sufficiently power the powered devices 402a-f). In other embodiments, the request for power at block 306 may be a request for any surplus power available to the second powering device 404.

Furthermore, while the first powering device 402 is illustrated and described as requesting power from a single second powering device 404, the first powering device 402 may request power from any number of powering devices (e.g., the first powering device 402 may also request power from the third powering device 406) at block 306. In some embodiments, the first powering device 402 may request power from more than one other powering device in response to determining that the second powering device 404 from which power was requested at block 306 does not have enough power to provide to the first powering device 402 to sufficiently power its powered device(s). As such, power may be requested by the first powering device from other powering devices based on a priority of those other powering device, based on which of those other powering devices has the highest surplus of power, based on which of those powering device has the fewest powered devices connected to it, etc. In another embodiment, the first powering device 402 may request power from more than one other powering device at block 306 in requested power amounts that distribute the power needed by the first powering device 402 to power its powered device(s) amongst each of the other powering device from which it is requesting power. While a few examples are provided, any methods for requesting power are envisioned as falling within the scope of the present disclosure.

Upon the power distribution engine 206 in the second powering device 404 determining that there is sufficient power available to provide to the first powering device 402, discussed in further detail below with regard to the first powering device 402 and with reference to decision block 312, the method 300 proceeds to block 308 where the first powering device receives power from the second powering device and provides power to its powered device(s). In an embodiment, the power distribution engine 206 in the second powering device 404 is configured to provide power from its power system 208 to the first powering device 402 via its coupling with the first powering device 402 through their respective trunk ports 210b. At block 308, the power distribution engine 206 in the first powering device 402 receives that power from the second powering device 404 and provides that power to the powered devices for which it was determined there was insufficient power available at decision block 304. The first powering device 402 may then operate to receive power from the second powering device 404 and provide that power from to one or more of its powered devices 402a-f until the power distribution engine 206 determines that the power available through the power system 208 in the first powering device 402 is sufficient to power each of its powered devices 402a-f. For example, upon determining that the power available through the power system 208 is sufficient to power each of the powered devices 402a-f, the power distribution engine 206 in the first powering device 402 may send a signal to the power distribution engine 206 in the second powering device 404 to cease providing power via its coupling with the first powering device 402 through their respective trunk ports 210b. As discussed above, the first powering device 402 may receive power from more than one other powering device at block 308, and may operate to receive, provision, and cease receiving that power from those other powering devices in substantially the same manner as described above with the second powering device 404. Furthermore, even in the event that other powering device are not able to provide enough power to the first powering device 402 to sufficiently power all of its powered devices 402a-f, any surplus power available to the other powered devices may be received and provisioned to its powered devices 402a-f by the first powering device 402 in order to sufficiently power as many of its powered device 402a-f as possible (e.g., using a priority scheme that prioritizes the powered devices 402a-f relative to each other).

Thus, the first powering device 402 may determine its available power (e.g., through its power system 208) is insufficient to power one or more of its powered devices 402a-f (e.g., due to a spike in power use by the powering device 402 and/or any of the powered devices 402a-f), and may then request and receive power from one or more connected powering devices and use that power to ensure that each of its powered devices 402a-f receives sufficient power. While only the first powering device 402 is illustrated as requesting and receiving power from the second powering device 404 at blocks 306 and 308, the first powering device 402 may request and receive power from the third powering device 406 in substantially the same manner as discussed above for the second powering device 404. As discussed above, each of the second powering device 404 and the third powering device 406 may also request and receive power from the first powering device 402 (or other connected powering devices, not illustrated) substantially similarly as described above for the first powering device 402. As such, power may be allocated throughout the IHS 400 from powering devices that have a surplus of power to powering devices that are running (or about to run) at a power deficit.

If, at decision block 304, it is determined that there is sufficient power available to the first powering device to power each of its powered devices, the method 300 may proceed to decision block 310 where it is determined whether the first powering device has received a request for power from a third powering device. In an embodiment of decision block 310, the power distribution engine 206 in the first powering device 402 may determine whether a request for power has been received from the third powering device 406 via its coupling with the third powering device 406 through their respective trunk ports 210b. As discussed above, the third powering device 406 may send requests for power other powering devices as well, and those other powering devices may operate substantially as discussed below for the first powering device 402. If at decision block 310 the power distribution engine 206 in the first powering device 402 determines that no request for power has been received from a third powering device, the method 300 proceeds back to decision block 304.

If at decision block 310 the power distribution engine 206 in the first powering device 402 determines that a request for power has been received from the third powering device 406, the method 300 proceeds to decision block 312 where it is determined whether power available to the first powering device is sufficient to provide power to the third powering device. In an embodiment of decision block 312, the power distribution engine 206 in the first powering device 402 may determine a surplus power amount that is available through its power system 208 and that is not being used by the first powering device 402 or its powered devices 402a-f. In other embodiments, the power distribution engine 206 in the first powering device 402 may simply determine that there is a power surplus (e.g., that each of the powered devices 402a-f is receiving full power, that there is unused power available from the power system 208, etc.) without quantifying that power surplus. In an embodiment, the request received at decision block 310 from the third powering device 406 may include a power insufficiency amount that may be an amount of power needed by the third powering device 406 to sufficiently power each of its powered devices 406a-c, and the power distribution engine 206 in the first powering device 402 may determine whether its power surplus is sufficient to provide power to the third powering device 406 via its coupling with the third powering device 402 through their respective trunk ports 210b. For example, the power distribution engine 206 in the first powering device 402 may determine whether its power surplus is greater than or equal to a power insufficiency amount that was requested by the third powering device 406. In another example, the power distribution engine 206 in the first powering device 402 may simply determine that it has a power surplus, all of which is available to provide to the third powering device 406, regardless of whether or not that power surplus is greater than or equal to a power insufficiency amount that was requested by the third powering device 406.

If, at decision block 312, the power distribution engine 206 in the first powering device 402 determines that there is sufficient power available to provide power to the third powering device 406, the method 300 proceeds to block 314 where power is provided to the third powering device. In an embodiment, the power distribution engine 206 in the first powering device 402 may provide any or all of its power surplus to the third powering device 406. For example, the first powering device 402 may provide an amount of its power surplus that is equal to a power insufficiency amount requested by the third powering device 406. In another example, the first powering device 402 may provide all of its power surplus to the third powering device 406. The first powering device 402 may then operate to provide power to the third powering device 406 for distribution to one or more of its powered devices 406a-c until the power distribution engine 206 in the third powering device 406 determines that the power available through its power system 208 is sufficient to power each of its powered devices 406a-c. For example, upon determining that the power available through its power system 208 is sufficient to power each of its powered devices 406a-c, the power distribution engine 206 in the third powering device 406 may send a signal to the power distribution engine 206 in the first powering device 402 to cease providing power via its coupling with the third powering device 406 through their respective trunk ports 210b.

In embodiments where the power surplus available to the first powering device 402 for provision to the third powering device 406 is insufficient to sufficiently power the powered devices 406a-c connected to the third powering device 406, other powering devices connected to the third powering device 406 may operate to provide power substantially as discussed above for the first powering device 402 in order to allow the powered devices 406a-c connected to the third powering device 406 to be sufficiently powered. Furthermore, even in the event that other powering device are not able to provide enough power to the third powering device 406 to sufficiently power all of its powered devices 406a-c, any surplus power available to the other powered devices may be received and provisioned to its powered devices 406a-c by the third powering device 406 in order to sufficiently power as many of its powered device 406a-c as possible (e.g., using a priority scheme that prioritizes the powered devices 406a-c relative to each other).

If, at decision block 312, the power distribution engine 206 in the first powering device 402 determines that there is not sufficient power available to provide power to the third powering device 406, the method 300 proceeds to block 316 where the first powering device 402 requests power from a second powering device(s). For example, at decision block 312, the power distribution engine 206 in the first powering device 402 may determine that there is no power surplus available to provide to the third powering device 406. In another example, at decision block 312, the power distribution engine 206 in the first powering device 402 may determine that the power surplus available to provide to the third powering device 406 is insufficient to sufficiently power the powered devices 406a-c connected to the third powering device 406 (e.g., based on a power insufficiency amount received from the third powering device 406. In an embodiment, the power distribution engine 206 in the first powering device 402 communicates, via its coupling with the second powering device 404 through respective trunk ports 210b, a request for power from the second powering device 404. In some embodiments, the request for power at block 316 may be a request for the power insufficiency amount received from the third powering device 406. In other embodiments, the request for power at block 316 may be a request for a power amount that is the difference between the power surplus available to the first powering device 402 and a power insufficiency amount requested by the third powering device 406. In yet other embodiments, the request for power at block 316 may be a request for any surplus power available to the second powering device 404. While a few examples are provided, any methods for requesting power are envisioned as falling within the scope of the present disclosure.

The method 300 then proceeds to block 318 where power received from the second powering device is provided to the third powering device. In an embodiment, the power distribution engine 206 in the first powering device 402 may receive power from the second powering device 404 via its coupling with the second powering device 404 through their respective trunk ports 210b substantially as described above with reference to block 308, and provide that power to the third powering device 406 via its coupling with the third powering device 406 through their respective trunk ports 210b. In one example, the first powering device 402 may receive power from the second powering device 404 and provide that power to the third powering device 406 without providing any power surplus from its power system 208. In another example, the first powering device 402 may receive power from the second powering device 404 and provide that power to the third powering device 406 along with at least a portion of a power surplus from its power system 208 substantially as described above in block 314. The first powering device 402 may then operate to receive power from the second powering device 404 and provide that power (along with providing power from its own power system 208 in some embodiments) to the third powering device 406 for distribution to one or more of its powered devices 406a-c until the power distribution engine 206 in the third powering device 406 determines that the power available through its power system 208 is sufficient to power each of the powered devices 406a-c. For example, upon determining that the power available through its power system 208 is sufficient to power each of the powered devices 406a-c, the power distribution engine 206 in the third powering device 406 may send a signal to the power distribution engine 206 in the first powering device 402 to cease providing power via its coupling with the third powering device 406 through third respective trunk ports 210b, and the power distribution engine 206 in the first powering device 402 may then send a signal to the power distribution engine 206 in the second powering device 404 to cease providing power via its coupling with the first powering device 406 through their respective trunk ports 210b.

Thus, the first powering device 402 may provide surplus power that is available through its power system 208 to a third connected powering device for use in ensuring that each of the powered devices coupled to that third connected powering device receive sufficient power. Furthermore, the first powering device 402 may provide surplus power that is available from a second connected powering device to a third connected powering device for use in ensuring that each of the powered devices coupled to that third connected powering device receive sufficient power. While only the first powering device 402 is discussed as providing (directly or as an intermediary) power to the third powering device 406, the first powering device 402 may retrieve power from and/or provide power to any number of connected powering devices. As discussed above, each of the second powering device 404 and the third powering device 406 may also provide power (directly or as an intermediary) to the first powering device 402 (or other connected powering devices, not illustrated) substantially similarly as described above for the first powering device 402. As such, power may be allocated throughout the IHS 400 from powering devices that have a surplus of power to powering devices that are running (or about to run) at a deficit.

Figure 5:
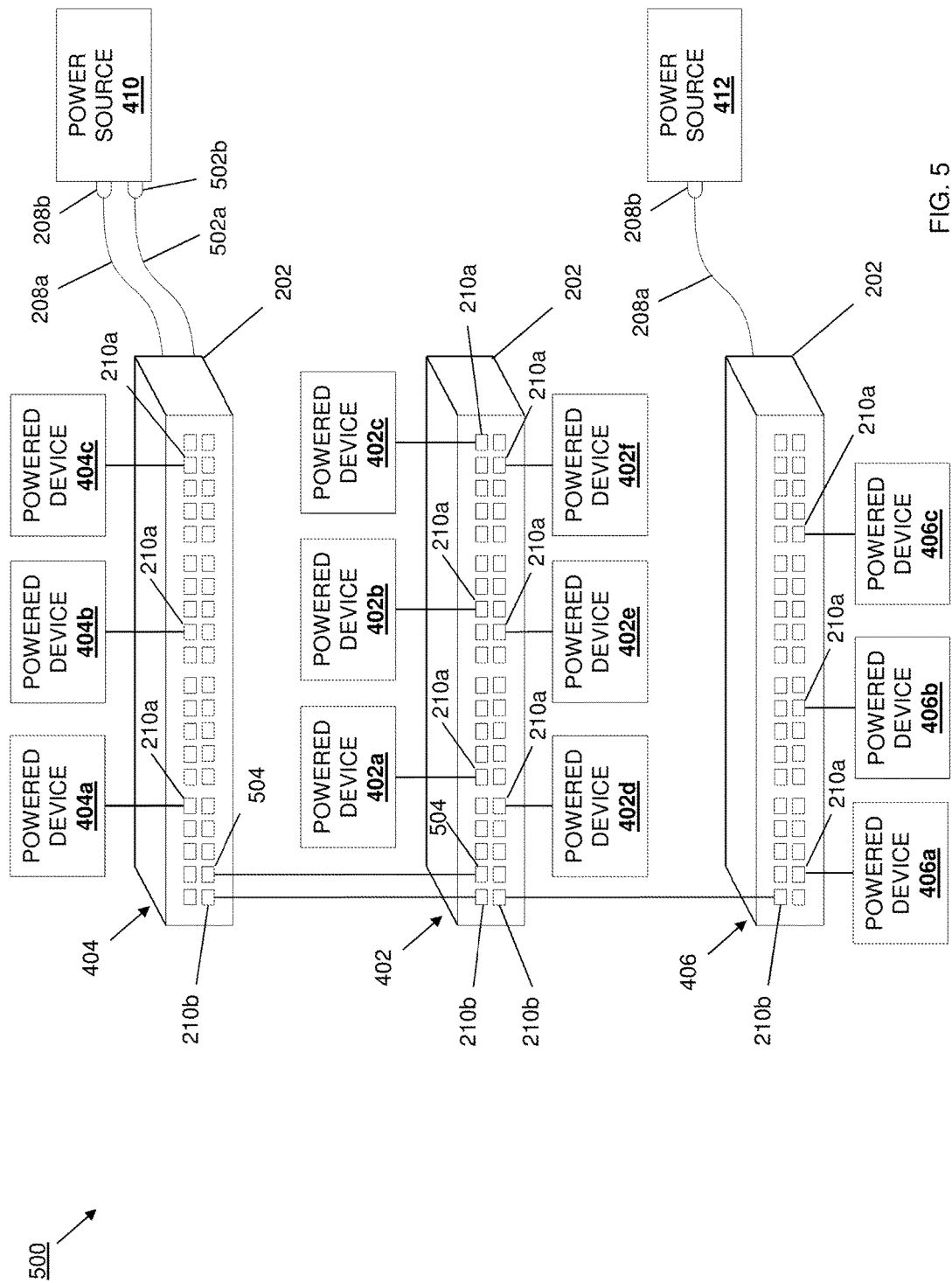
FIG. 5 is a schematic view illustrating another embodiment of a plurality of the switch IHSs of FIGS. 2a and 2b coupled to each other, powered devices, and power sources.

Referring now to FIG. 5, an embodiment of an IHS 500 is illustrated that is substantially similar to the IHS 400 discussed above, but with a few modifications. In the illustrated embodiment, the second powering device 404 in the IHS 500 includes multiple couplings to the power source 410, through the power cable 208a and power source connector 208b discussed above, as well as through a secondary power cable 502a and power source connector 502b. In an embodiment, the multiple couplings to the power source 410 are provided through multiple power systems (e.g., similar to the power system 208 discussed above), a larger power system, and/or a variety of enhanced power systems known in the art. Furthermore, in addition to being coupled together through their respective trunk ports 210b discussed above, the first powering device 402 and the second powering device 404 are coupled together with at least one additional set of respective secondary trunk ports 504. Further still, the first powering device 402 is not connected to a power source (i.e., the power source 408 has been omitted from the IHS 500, and in some embodiments the first powering device 402 may further have its power system 208 omitted as well.)

The IHS 500 illustrates how a powering device such as the first powering device 402 may receive all of its power from other powering devices (e.g., the second powering device 404 and the third powering device 406 in the illustrated embodiment.) As such, the first powering device 402 may operate according to the method 300 discussed above to ensure that each of its powered devices 402a-f are sufficiently powered through power requested and received from the second powering device 404 and/or the third powering device 406. Furthermore, the IHS 500 illustrates how a powering device such as the second powering device 404 may be configured to couple to a relatively large surplus of power (e.g., via the multiple couplings to the power source 410 and, in some embodiments, through the use of multiple power systems in the powering device 404) for provision to other powering devices. As such, the second powering device 404 may operate to supply power to a larger number of other powering devices and powered devices. Further still, the IHS 500 illustrates how powering devices such as the first powering device 402 and the second powering device 404 may be coupled together (e.g., via the multiple respective trunk ports 210b and 504) to increase the amount of power available that can be transmitted between powering devices. In an example, the trunk ports 210b and 504 on the first powering device 402 and/or the second powering device 404 may be aggregated and/or grouped such as, for example, by configuring those trunk ports 210b and 504 as a Link Aggregation Group (LAG). As such, the coupling provided between the first powering device 402 and the second powering device 404 through the trunk ports 210b and 504 may be configured to provide a higher data bandwidth and power bandwidth according to the method 300. While only two sets of trunk ports have been illustrated as being configured as part of a LAG, any number of trunk ports may be configured in a LAG while remaining within the scope of the present disclosure.

Some embodiments of the power distribution systems discussed above describe ports on the powering devices that are configured to both receive and provide power, while other embodiments of the power distribution systems discussed above describe ports on the powering devices that are configured to either receive power or provide power. As is known in the art, conventional ports used in conventional PoE and other combined data/power transmission systems typically include conventional PHY chips that are configured to either send or receive power. As such, those embodiments described above in which a port on the powering device both sends and receives power envision a PHY chip that is configured to both send and receive power, which is in the realm of one of skill in the art in possession of the present disclosure, but which may be associated with higher costs. The present disclosure provides a more detailed discussion of multiple embodiments of a power distribution system that operate via ports that include lower cost, conventional PHY chips that are configured to either send or receive power, which as discussed below allows for the provisioning of the power distribution system discussed above in a variety of different scenarios and configurations that take advantage of commodity PHY chips that lower the cost of the system while still providing power distribution functionality between the powering devices.

Figure 6A:
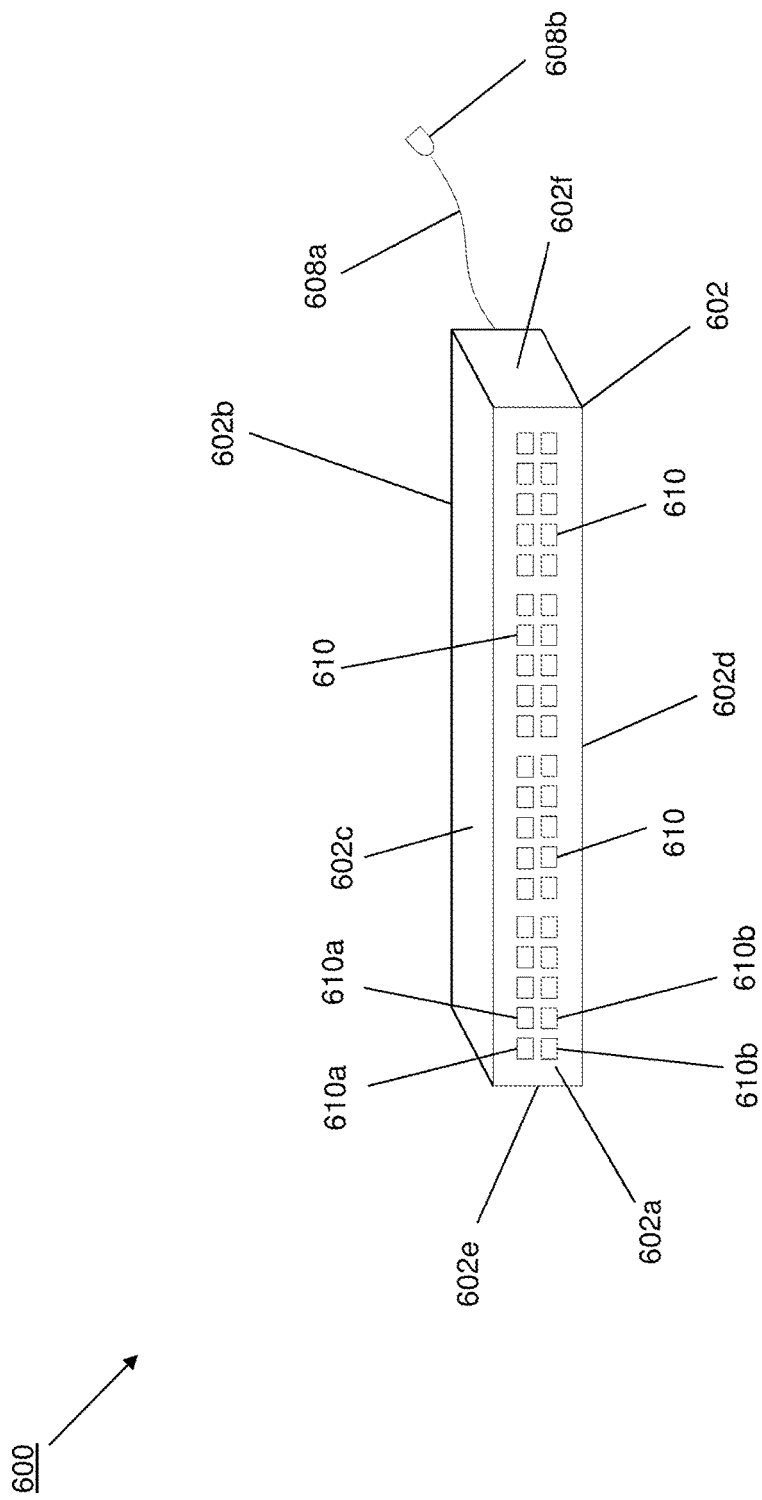
FIG. 6a is a front view illustrating an embodiment of a powering device provided as a networking switch device.
Figure 7:
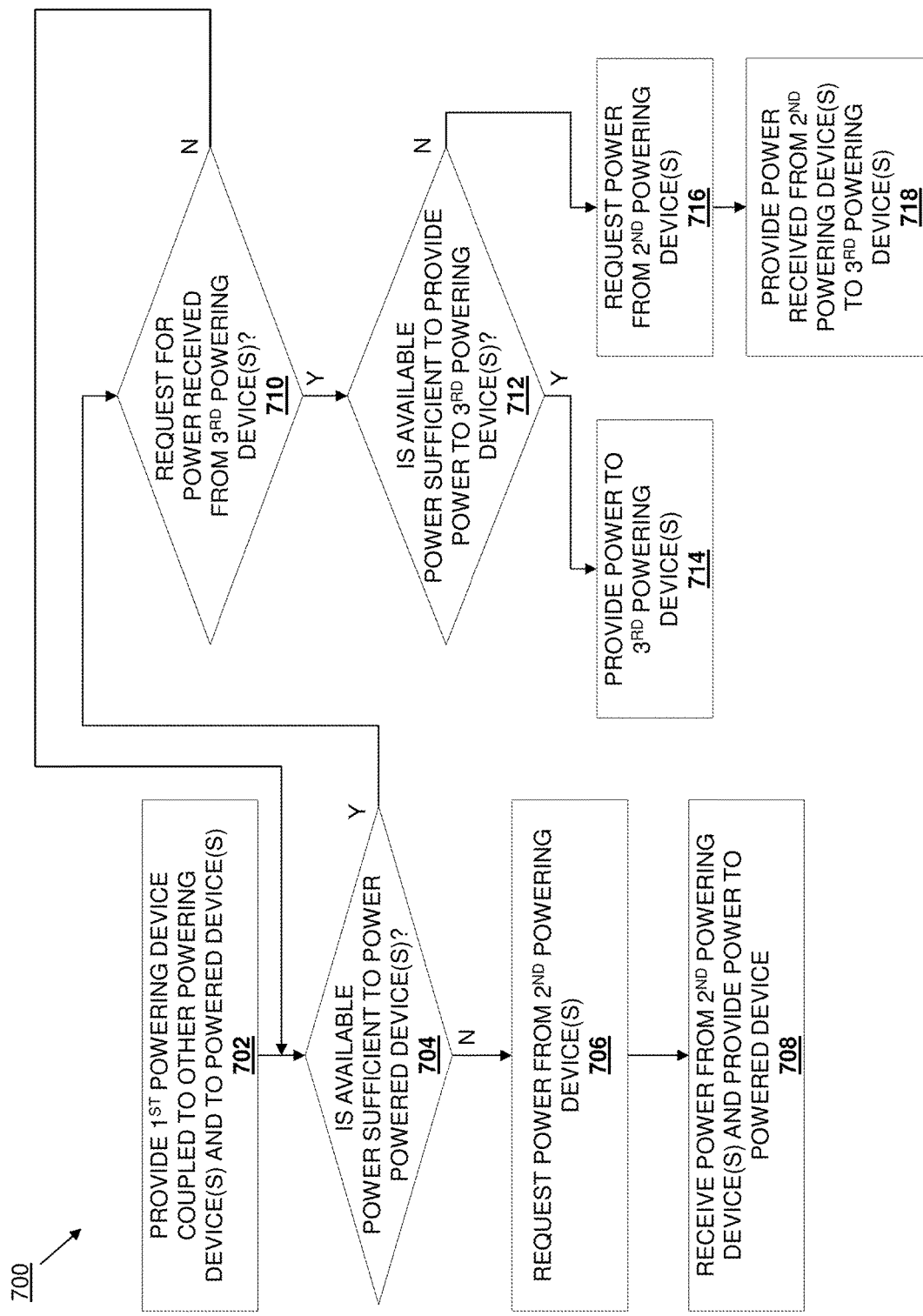
FIG. 7 is a flow chart illustrating an embodiment of a method for distributing power.

Referring now to FIGS. 6a and 6b, an embodiment of a powering device 600 is illustrated. In an embodiment, the powering device 600 may be the IHS 100, discussed above with reference to FIG. 1, and/or may include some or all of the components of the IHS 100. In the illustrated embodiment, the powering device 600 is a networking switch device. However, the powering device 600 may be a server device, a storage device, other types of networking devices, and/or a variety of other IHSs known in the art while remaining within the scope of the present disclosure. As discussed in further detail below, the powering device 600 is configured to provide power to one or more connected powered devices. For example, the powering device 600 may be a Power over Ethernet (PoE) enabled device, a PoE+ enabled device, a Universal PoE (UPoE) enabled device, and/or be enabled with a variety of other power provisioning technologies known in the art. As such, the powering device 600 may be configured to provide power over cables (e.g., Ethernet cables) to powered devices that are connected to those cables.

The powering device 600 includes a chassis 602 having a front surface 602a, a rear surface 602b that is located opposite the chassis 602 from the front surface 602a, a top surface 602c that extends between the front surface 602a and the rear surface 602b, a bottom surface 602d that is located opposite the chassis 602 from the top surface 602c and that extends between the front surface 602a and the rear surface 602b, and a pair of side surfaces 602e and 602f that are located opposite the chassis 602 from each other and that each extend between the front surface 602a, the rear surface 602b, the top surface 602c, and the bottom surface 602d. A chassis housing 604 is defined by the chassis 602 between the front surface 602a, the rear surface 602b, the top surface 602c, the bottom surface 602d, and the side surfaces 602e and 602f. In an embodiment, the powering device 600 may include a processing system (e.g., the processor 102 discussed above with reference to FIG. 1) that is located in the chassis housing 602 and that is coupled to a non-transitory memory system (e.g., the system memory 114 discussed above with reference to FIG. 1) that is located in the chassis housing 602 and that includes instruction that, when executed by the processing system, cause the processing system to provide a power distribution engine 606 that is configured to perform the functions of the power distributions engines discussed below.

In the illustrated embodiment, the power distribution engine 606 is coupled to a power system 608 (e.g., through the coupling of the processing system in the chassis housing 602 with the power system 608) that is located in the chassis housing 602 and that includes a power cable 608a that extends from the rear surface 602b of the chassis 602 and includes a power source connector 608b on its distal end. The power system 608 may be configured to receive power from a power source (e.g., through the power source connector 608b and power cable 608a), convert that power such that it may be used by components of the powering device 600, and/or provide a variety of other power system functions known in the art. However, in other embodiments, the power system 608 may be omitted and the power distribution engine 606 may operate to distribute power received through its receiving PoE ports from other powering devices.

The power distribution engine 606 is also coupled to a plurality of ports 610 that are accessible on the front surface 602a of the chassis 602. In an embodiment, any or all of the plurality of ports 610 may be configured send and receive data, as well as to either receive power or provide power. For example, any or all of the plurality of ports 610 may be PoE ports, PoE+ ports, UPoE ports, and/or a variety of other data and power receiving and/or provisioning ports known in the art that may each include a PHY chip that is configured to send and receive data as well as either 1) receive power or 2) provide power. In a specific example, the port(s) on the powering device that include a PHY chip that is configured to receive power may be marked as such, and the port(s) on the powering device that include a PHY chip that is configured to provide power may be marked as such (e.g., via an marking or other identifier on the front surface 602a of the chassis 602 that is adjacent that port and that indicates the power provisioning or receiving functionality of that port.) In the specific examples discussed below, a subset 610a of the plurality of ports 610 each include a PHY chip that is configured to receive power, a subset 610b of the plurality of ports 610 each include a PHY chip that is configured to provide power, and any or all of the remainder of the plurality of ports 610 (i.e., other than the subsets 610a and 610b) may include a PHY chip that is configured to provide power. However, one of skill in the art in possession of the present disclosure will recognize that different port configurations and port types (e.g., including ports without PHY chips that are configured to either receive or provide power such that that port is only configured to send and receive data) will fall within the scope of the present disclosure as well. It should be understood that the powering device 600 may include a variety of other components (e.g., networking components, computing components, etc.) that have been omitted for clarity of illustration and discussion.

In the embodiments illustrated and described below, the powering device(s) 600 are networking switch devices, and the plurality of ports 610 may be configured by a user, administrator, or automatically as access ports for connection to powered devices, or as trunk ports for connection to other powering devices (e.g., other networking switch devices in the embodiments illustrated and described below.) Furthermore, any subset of plurality of the ports 610 may be aggregated/grouped by configuring that subset as a Link Aggregation Group (LAG) or other aggregation/group known in the art. The details for configuring the ports 610 on the powering device 600 as access ports, trunk ports, or in a LAG should be understood by those of skill in the art in possession of the present disclosure and thus are not discussed herein in detail. However, one of skill in the art will recognize that the plurality of ports 610 may not be part of a networking switch device (e.g., they may be part of another type of IHS or powering device), and/or may not configured as access ports, trunk ports, or part of a LAG while remaining within the scope of the present disclosure. Thus, while the discussion and illustrations below focus on a plurality of networking switch powering devices that are coupled together through ports that are configured as trunk ports, while also being coupled to powered devices through ports that are configured as access ports, and that operate to share power between each other through the trunk ports for provision to their respective powered devices through the access ports, other types of IHSs/powering devices having other types of ports are envisioned as falling within the scope of the present disclosure.

Figure 8:
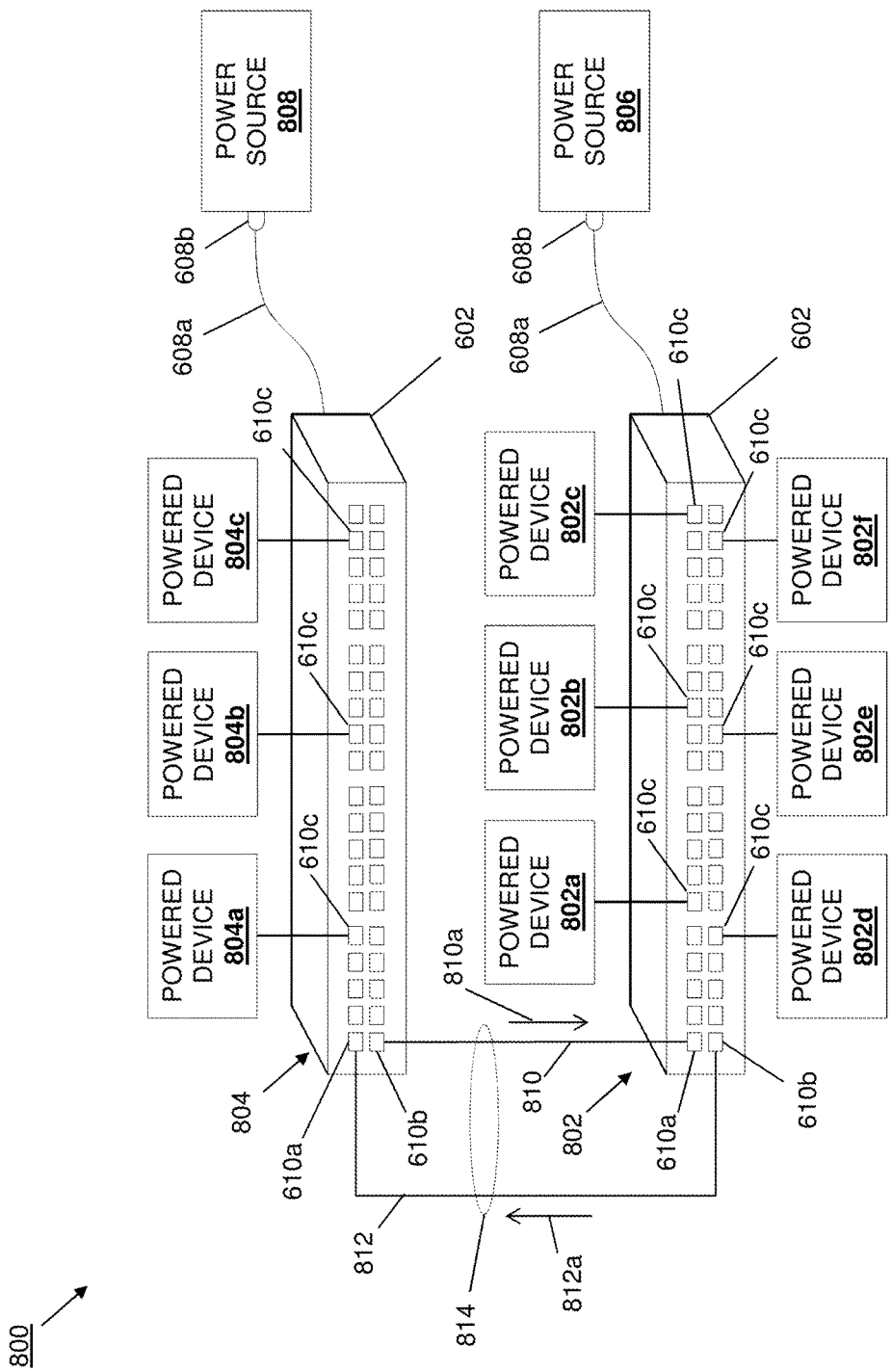
FIG. 8 is a schematic view illustrating an embodiment of a plurality of the powering devices of FIGS. 6a and 6b coupled to each other, powered devices, and power sources.

Referring now to FIGS. 7, 8, 9, and 10, an embodiment of a method 700 for distributing power is illustrated. The method 700 begins at block 702 where a first powering device is provided that is coupled to other powering device(s) and to powered device(s). Referring first to FIG. 8, an embodiment of a power distribution system 800 is illustrated that may be provided during block 702 of the method 700, and provides an example of a simplified power distribution system including only two powering devices. The power distribution system 800 includes a first powering device 802 and a second powering device 804. In the illustrated embodiment, each of the first powering device 802 and the second powering device 804 are substantially similar to the powering device 600 discussed above with reference to FIGS. 6a and 6b, and include the same reference numbers for similar components.

In the embodiment illustrated in FIG. 8, the power source connector 608b on the power cable 608a that extends from the first powering device 802 is coupled to a power source 806. At least a subset 610c of the plurality of ports 610 on the first powering device 802 have been configured as access ports and are each coupled (e.g., via a cable such as an Ethernet cable) to a respective powered device 802a, 802b, 802c, 802d, 802e, and 802f. In the examples discussed below, each of the subset 610c of the plurality of ports 610 on the first powering device 802 includes a respective PHY chip that is configured to send and receive data, as well as provide power. In addition, one of the subset 610a of the plurality of ports 610 on the first powering device 802 that includes a PHY chip that is configured to receive power has been configured as a trunk port and is connected to a cable 810 (e.g., an Ethernet cable), and one of the subset 610b of the plurality of ports 610 on the first powering device 802 that includes a PHY chip that is configured to provide power has been configured as a trunk port and is connected to a cable 812 (e.g., an Ethernet cable).

Similarly, the power source connector 608b on the power cable 608a that extends from the second powering device 804 is coupled to a power source 808. At least a subset 610c of the plurality of ports 610 on the second powering device 804 have been configured as access ports and are each coupled via a cable (e.g., an Ethernet cable) to a respective powered device 804a, 804b, and 804c. As discussed below, each of the subset 610c of the plurality of ports 610 on the second powering device 804 includes a respective PHY chip that is configured to send and receive data, as well as provide power. In addition, one of the subset 610a of the plurality of ports 610 on the second powering device 804 that includes a PHY chip that is configured to receive power has been configured as a trunk port and is connected to the cable 810 that is also connected to the one of the subset 610b of the plurality of ports 610 on the first powering device 802 that includes the PHY chip that is configured to provide power, and one of the subset 610b of the plurality of ports 610 on the second powering device 804 that includes a PHY chip that is configured to provide power has been configured as a trunk port and is connected to the cable 812 that is also connected to the one of the subset 610a of the plurality of ports 610 on the first powering device 802 that includes the PHY chip that is configured to receive power. In FIG. 8, an arrow 810a indicates an available power transfer directionality via the cable 810 from the one of the subset 610b of the plurality of ports 610 on the second powering device 804 to the one of the subset 610a of the plurality of ports 610 on the first powering device 802, and an arrow 812a indicates an available power transfer directionality via the cable 812 from the one of the subset 610b of the plurality of ports 610 on the first powering device 802 to the one of the subset 610a of the plurality of ports 610 on the second powering device 804. However, as discussed above, each of the cables 810 and 812 are configured to transfer data in both directions between the first powering device 802 and the second powering device 804.

In a specific example of port data capacities that may be utilized in the power distribution system 800, the first powering device 802 is a first networking device that includes a 10 Gigabit Ethernet port that is coupled to a network (e.g., the Internet, not illustrated), a 1 Gigabit Ethernet port as the one of the subset 610a of the plurality of ports 610 on the first networking device, and a 1 Gigabit Ethernet port as the one of the subset 610b of the plurality of ports 610 on the first networking device; and the second powering device 804 is a second networking device that includes a 1 Gigabit Ethernet port as the one of the subset 610a of the plurality of ports 610 on the second networking device, and a 1 Gigabit Ethernet port as the one of the subset 610b of the plurality of ports 610 on the second networking device. However, as discussed below, in other embodiments, powering devices may couple to powered devices and/or powering device via multiple ports that are configured to provide power. For example, in order to ensure a desired capacity for the power sharing discussed below, the first powering device 802 may be coupled to the second powering device 804 by multiple 1 Gigabit Ethernet ports that are configured to receive power, and/or multiple 1 Gigabit Ethernet ports that are configured to provide power. Furthermore, in some embodiments, powering device may be coupled to powered devices and/or powering devices by higher capacity ports. For example, in order to ensure a desired capacity for the power sharing discussed below, the first powering device 802 may be coupled to the second powering device 804 by one or more 10 Gigabit (or higher speed) Ethernet ports that are configured to receive power, and one or more other Ethernet ports (e.g., the 1 Gigabit Ethernet ports discussed above, as well as higher capacity Ethernet ports in other embodiments) that are configured to provide power. While there are currently no 10 Gigabit (or higher speed) PoE, PoE+, or UPoE ports known to the inventors of the present disclosure, such advances are within one of skill in the art, and it would be understood by one of skill in the art possession of the present disclosure that the larger gauge cabling using with higher capacity ports (e.g., cat6 cabling used with 10 Gigabit Ethernet ports vs. cat5/5e cabling used with 1 Gigabit Ethernet ports) may provide for higher power transfer between powering devices if those higher capacity ports are enabled to send and/or receive power. Thus, levels of power sharing capacity may be enabled in a variety of manner that would be apparent to one of skill in the art in possession of the present disclosure.

As illustrated in FIG. 8, the link provided by the cable 812 between the one of the subset 610b of the plurality of ports 610 on the second powering device 804 that includes a PHY chip that is configured to provide power and the one of the subset 610a of the plurality of ports 610 on the first powering device 802 that includes the PHY chip that is configured to receive power, and the link provided by the cable 810 between the one of the subset 610b of the plurality of ports 610 on the second powering device 804 that includes a PHY chip that is configured to provide power and the one of the subset 610a of the plurality of ports 610 on the first powering device 802 that includes the PHY chip that is configured to receive power, may be aggregated to provide a Link Aggregation Group (LAG) 814. One of skill in the art in possession of the present disclosure will recognize that the particular LAG 814 in the power distribution system 800 as illustrated in FIG. 8 may provide for aggregated data links that expand the data transfer capacity between the first powering device 802 and the second powering device 804 (i.e., by allowing the sending and receiving of data over each of the two links), but does not provide for aggregated power links (i.e., because the ports connected to the link provided by the cable 810 only allow for second powering device 804 to provide power in one direction to the first powering device 802, and the ports connected to the link provided by the cable 812 only allow for first powering device 802 to provide power in one direction to the second powering device 804).

However, in other embodiments, the aggregation of power links is envisioned as falling within the scope of the present disclosure as well. For example, multiple links between the first powering device 802 and the second powering device 804 may be provided by respective cables between the subset 610a of the plurality of ports 610 on the first powering device 804 that each include a PHY chip that is configured to receive power, and the subset 610b of the plurality of ports 610 on the second powering device 804 that includes the PHY chip that is configured to send power, and those multiple links may be aggregated in a LAG such that aggregated power links are provided that expand the capacity to provide power from the second powering device 804 to the first powering device 802. Similarly, multiple links between the first powering device 802 and the second powering device 804 may be provided by respective cables between the subset 610*b* of the plurality of ports 610 on the first powering device 804 that includes a PHY chip that is configured to provide power, and the subset 610*a* of the plurality of ports 610 on the second powering device 804 that includes the PHY chip that is configured to receive power, and those multiple links may be aggregated in a LAG such that aggregated power links are provided that expand the capacity to provide power from the first powering device 802 to the second powering device 804.

In an embodiment, any of the powered devices 802*a-f* and 804*a-c* may be wireless access points, cameras, phones, clocks, security access devices, remote sensors, remote monitoring devices, powered Bluetooth devices, radio frequency identification (RFID) readers, personal digital assistants (PDAs), laptop computers, and/or a variety of other powered devices known in the art. The power sources 806 and 808 may be the same power source, different power sources, and combinations thereof, and may include, for example, power sources that may be connected to through a wall outlet (as illustrated), hardwired power sources, and/or a variety of other power sources known in the art. While the illustrated example provides only two networking switch powering devices coupled together through trunk ports, while being coupled to powered devices through access ports, and being coupled to power sources, more or fewer powering devices, other types of powering devices, more or fewer powered devices, more or fewer power sources, other types of couplings and coupling ports, and/or a wide variety of other modifications to the power distribution system 800 will provide systems that will benefit from the power distribution techniques discussed below and are envisioned as falling within the scope of the present disclosure.

Figure 9:
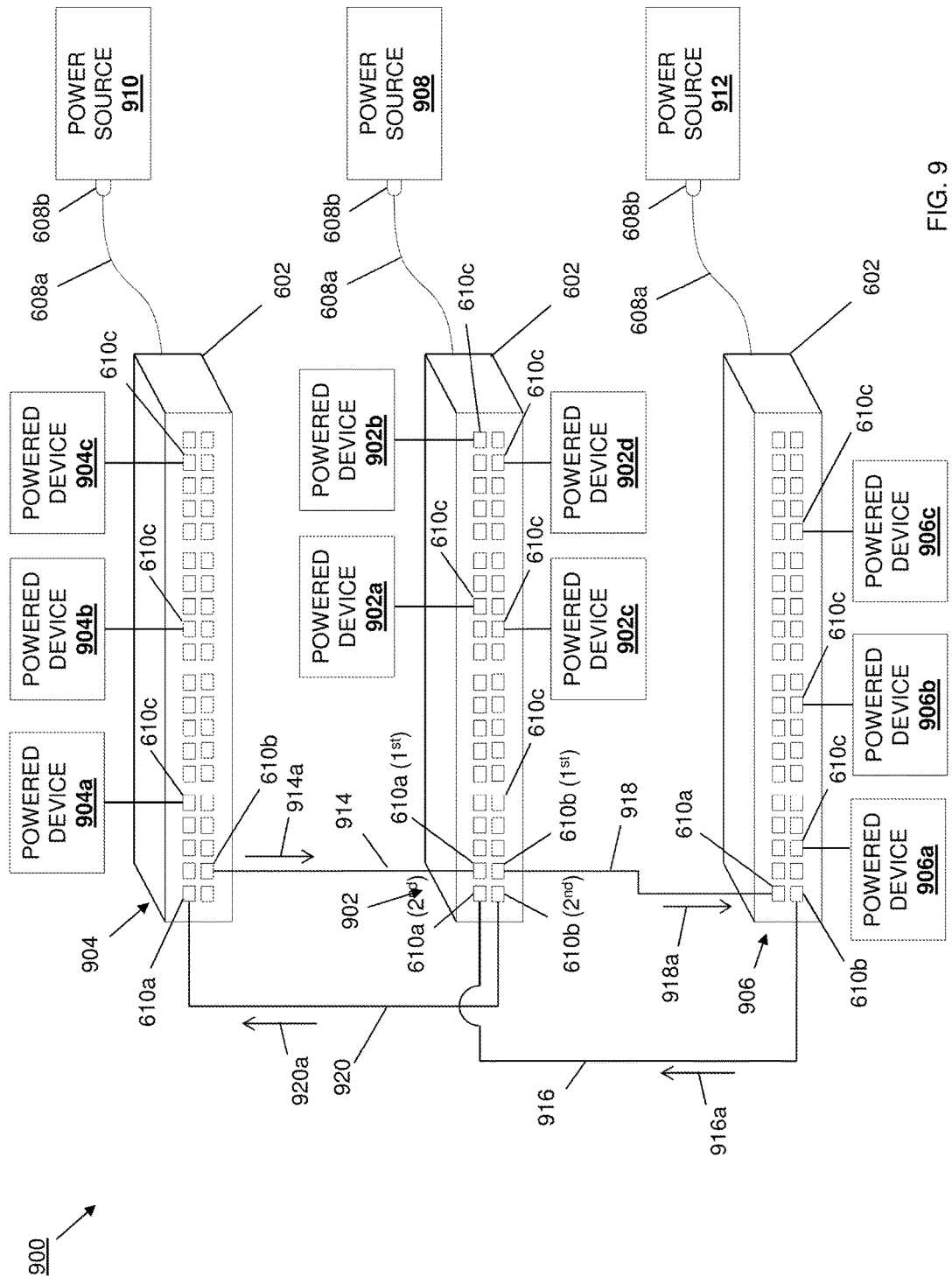
FIG. 9 is a schematic view illustrating another embodiment of a plurality of the powering devices of FIGS. 6a and 6b coupled to each other, powered devices, and power sources.

Referring now to FIG. 9, an embodiment of a power distribution system 900 is illustrated that may be provided during block 702 of the method 700, and provides an example of a power distribution system that may allow a powering device to receive power from more than one other powering device, and/or pass power between two other powering devices. The power distribution system 900 includes a first powering device 902, a second powering device 904, and a third powering device 906. In the illustrated embodiment, each of the first powering device 902, the second powering device 904, and the third powering device 906 are substantially similar to the powering device 600 discussed above with reference to FIGS. 6*a* and 6*b*, and include the same reference numbers for similar components.

In the embodiment illustrated in FIG. 9, the power source connector 608*b* on the power cable 608*a* that extends from the first powering device 802 is coupled to a power source 908. At least a subset 610*c* of the plurality of ports 610 on the first powering device 902 have been configured as access ports and are each coupled (e.g., via a cable such as an Ethernet cable) to respective powered devices 902*a*, 902*b*, 902*c*, and 902*d*. As discussed below, each of the subset 610*c* of the plurality of ports 610 on the first powering device 902 includes a respective PHY chip that is configured to send and receive data, as well as provide power. In addition, a first of the subset 610*a* of the plurality of ports 610 on the first powering device 902 that includes a PHY chip that is configured to receive power has been configured as a trunk port and is connected to a cable 914 (e.g., an Ethernet cable), a second of the subset 610*a* of the plurality of ports 610 on the first powering device 902 that includes a PHY chip that is configured to receive power has been configured as a trunk port and is connected to a cable 916 (e.g., an Ethernet cable), a first of the subset 610*b* of the plurality of ports 610 on the first powering device 802 that includes a PHY chip that is configured to provide power has been configured as a trunk port and is connected to a cable 918 (e.g., an Ethernet cable), and a second of the subset 610*b* of the plurality of ports 610 on the first powering device 802 that includes a PHY chip that is configured to provide power has been configured as a trunk port and is connected to a cable 920 (e.g., an Ethernet cable).

Similarly, the power source connector 608*b* on the power cable 608*a* that extends from the second powering device 904 is coupled to a power source 910. At least a subset 610*c* of the plurality of ports 610 on the second powering device 804 have been configured as access ports and are each coupled via a cable (e.g., an Ethernet cable) to respective powered devices 904*a*, 904*b*, and 904*c*. As discussed below, each of the subset 610*c* of the plurality of ports 610 on the second powering device 904 includes a respective PHY chip that is configured to send and receive data, as well as provide power. In addition, one of the subset 610*a* of the plurality of ports 610 on the second powering device 904 that includes a PHY chip that is configured to receive power has been configured as a trunk port and is connected to the cable 920 that is also connected to the second of the subset 610*b* of the plurality of ports 610 on the first powering device 902 that includes the PHY chip that is configured to provide power, and one of the subset 610*b* of the plurality of ports 610 on the second powering device 904 that includes a PHY chip that is configured to provide power has been configured as a trunk port and is connected to the cable 914 that is also connected to the first of the subset 610*a* of the plurality of ports 610 on the first powering device 902 that includes the PHY chip that is configured to receive power. In FIG. 9, an arrow 914*a* indicates an available power transfer directionality via the cable 914 from the one of the subset 610*b* of the plurality of ports 610 on the second powering device 904 to the one of the subset 610*a* of the plurality of ports 610 on the first powering device 902, and an arrow 920*a* indicates an available power transfer directionality via the cable 920 from the second of the subset 610*b* of the plurality of ports 610 on the first powering device 902 to the one of the subset 610*a* of the plurality of ports 610 on the second powering device 904. However, as discussed above, each of the cables 914 and 920 are configured to transfer data in both directions between the first powering device 902 and the second powering device 904.

Similarly, the power source connector 608*b* on the power cable 608*a* that extends from the third powering device 906 is coupled to a power source 912. At least a subset 610*c* of the plurality of ports 610 on the third powering device 906 have been configured as access ports and are each coupled via a cable (e.g., an Ethernet cable) to respective powered devices 906*a*, 906*b*, and 906*c*. As discussed below, each of the subset 610*c* of the plurality of ports 610 on the third powering device 906 includes a respective PHY chip that is configured to send and receive data, as well as provide power. In addition, one of the subset 610*a* of the plurality of ports 610 on the third powering device 906 that includes a PHY chip that is configured to receive power has been configured as a trunk port and is connected to the cable 918 that is also connected to the first of the subset 610*b* of the plurality of ports 610 on the first powering device 902 that includes the PHY chip that is configured to provide power, and one of the subset 610*b* of the plurality of ports 610 on the third powering device 906 that includes a PHY chip that is configured to provide power has been configured as a trunk port and is connected to the cable 916 that is also connected to the second of the subset 610*a* of the plurality of ports 610 on the first powering device 902 that includes the PHY chip that is configured to receive power. In FIG. 9, an arrow 918*a* indicates an available power transfer directionality via the cable 918 from the first of the subset 610*b* of the plurality of ports 610 on the first powering device 902 to the one of the subset 610*a* of the plurality of ports 610 on the third powering device 906, and an arrow 916*a* indicates an available power transfer directionality via the cable 916 from the one of the subset 610*b* of the plurality of ports 610 on the third powering device 906 to the second of the subset 610*a* of the plurality of ports 610 on the first powering device 902. However, as discussed above, each of the cables 916 and 918 are configured to transfer data in both directions between the first powering device 902 and the second powering device 906.

Similarly as in the port data capacities example for the power distribution system 800 described above, in the power distribution system 900 the first powering device 902 may be a first networking device that includes a 10 Gigabit Ethernet port that is coupled to a network (e.g., the Internet, not illustrated), as well as 1 Gigabit Ethernet ports for the first and second of the subset 610*a* of the plurality of ports 610 on the first networking device, and the first and second of the subset 610*b* of the plurality of ports 610 on the first networking device; the second powering device 904 may be a second networking device that includes a 1 Gigabit Ethernet port as the one of the subset 610*a* of the plurality of ports 610 on the second networking device, and a 1 Gigabit Ethernet port as the one of the subset 610*b* of the plurality of ports 610 on the second networking device; and the third powering device 906 may be a third networking device that includes a 1 Gigabit Ethernet port as the one of the subset 610*a* of the plurality of ports 610 on the third networking device, and a 1 Gigabit Ethernet port as the one of the subset 610*b* of the plurality of ports 610 on the third networking device. However, as also discussed above, in other embodiments, powering devices may couple to powered devices and/or powering device via multiple ports that are configured to provide power, and powering devices may be coupled to powered devices and/or powering devices by higher capacity ports, enabling levels of power sharing capacity in a variety of manners that would be apparent to one of skill in the art in possession of the present disclosure Furthermore, links provided by the cables 914, 916, 918, and 920 (and/or other cables in other embodiments) may be aggregated as discussed above as well.

Similarly as described above, any of the powered devices 902*a-d*, 904*a-c*, and 906*a-c* may be wireless access points, cameras, phones, clocks, security access devices, remote sensors, remote monitoring devices, powered Bluetooth devices, radio frequency identification (RFID) readers, personal digital assistants (PDAs), laptop computers, and/or a variety of other powered devices known in the art. The power sources 908, 910, and 912 may be the same power source, different power sources, and combinations thereof, and may include, for example, power sources that may be connected to through a wall outlet (as illustrated), hardwired power sources, and/or a variety of other power sources known in the art. While the illustrated example provides only three networking switch powering devices coupled together through trunk ports, while being coupled to powered devices through access ports, and being coupled to power sources, more or fewer powering devices, other types of powering devices, more or fewer powered devices, more or fewer power sources, other types of couplings and coupling ports, and/or a wide variety of other modifications to the power distribution system 900 will provide systems that will benefit from the power distribution techniques discussed below and are envisioned as falling within the scope of the present disclosure.

Figure 10:
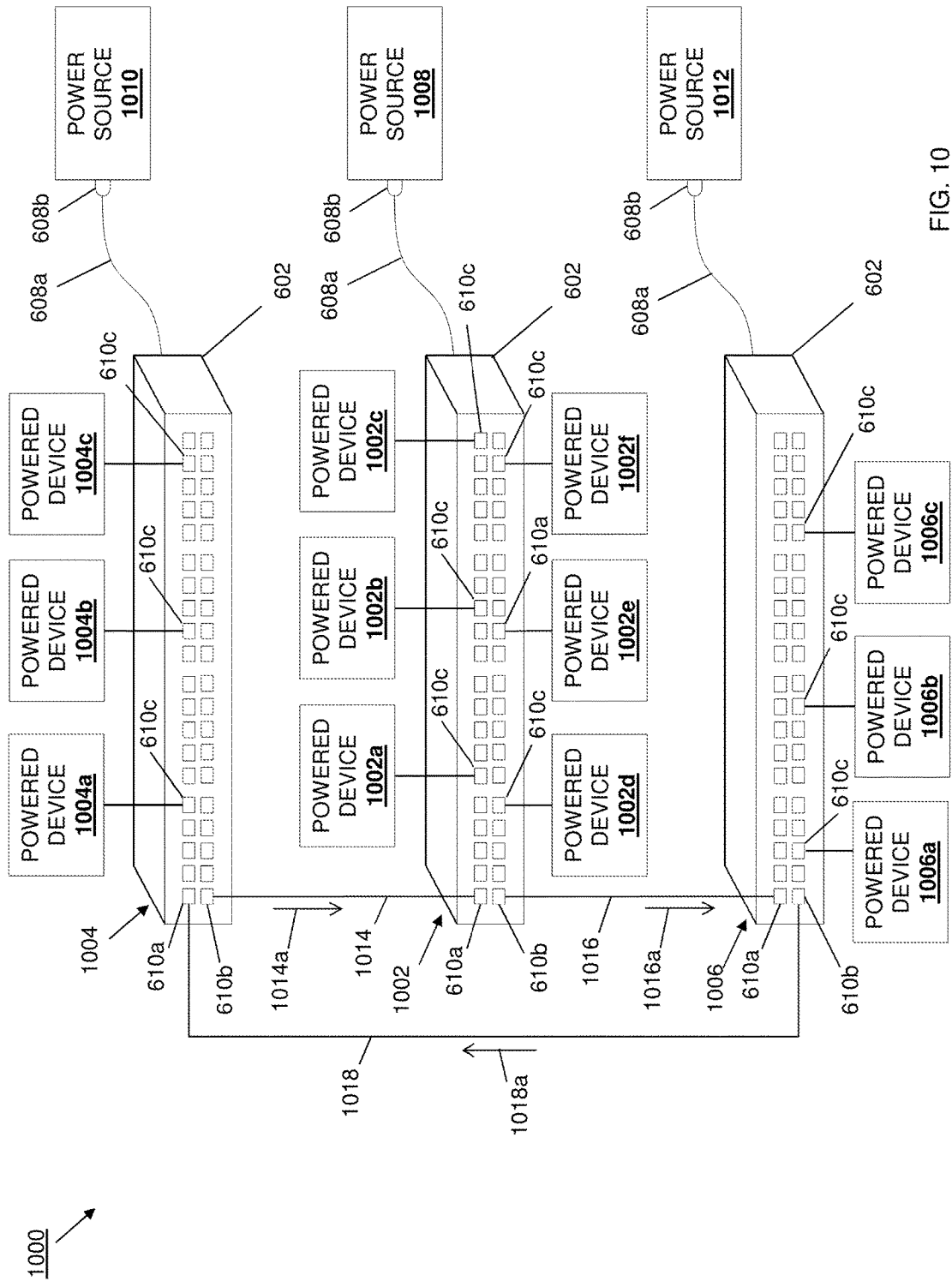
FIG. 10 is a schematic view illustrating another embodiment of a plurality of the powering devices of FIGS. 6a and 6b coupled to each other, powered devices, and power sources.

Referring now to FIG. 10, an embodiment of a power distribution system 1000 is illustrated that may be provided during block 702 of the method 700, and provides an example of a power distribution system with three (or more) powering devices and in which each powering device need only include a single trunk port that is configured to send power and a single trunk port that is configured to receive power while still allowing power sharing throughout the system. The power distribution system 1000 includes a first powering device 1002, a second powering device 1004, and a third powering device 1006. In the illustrated embodiment, each of the first powering device 1002, the second powering device 1004, and the third powering device 1006 are substantially similar to the powering device 600 discussed above with reference to FIGS. 6*a* and 6*b*, and include the same reference numbers for similar components.

In the embodiment illustrated in FIG. 10, the power source connector 608*b* on the power cable 608*a* that extends from the first powering device 1002 is coupled to a power source 1008. At least a subset 610*c* of the plurality of ports 610 on the first powering device 1002 have been configured as access ports and are each coupled (e.g., via a cable such as an Ethernet cable) to respective powered devices 1002*a*, 1002*b*, 1002*c*, 1002*d*, 1002*e*, and 1002*f*. As discussed below, each of the subset 610*c* of the plurality of ports 610 on the first powering device 1002 includes a respective PHY chip that is configured to send and receive data, as well as provide power. In addition, one of the subset 610*a* of the plurality of ports 610 on the first powering device 1002 that includes a PHY chip that is configured to receive power has been configured as a trunk port and is connected to a cable 1014 (e.g., an Ethernet cable), and one of the subset 610*b* of the plurality of ports 610 on the first powering device 1002 that includes a PHY chip that is configured to provide power has been configured as a trunk port and is connected to a cable 1016 (e.g., an Ethernet cable).

Similarly, the power source connector 608*b* on the power cable 608*a* that extends from the second powering device 1004 is coupled to a power source 1010. At least a subset 610*c* of the plurality of ports 610 on the second powering device 1004 have been configured as access ports and are each coupled via a cable (e.g., an Ethernet cable) to respective powered devices 1004*a*, 1004*b*, and 1004*c*. As discussed below, each of the subset 610*c* of the plurality of ports 610 on the second powering device 1004 includes a respective PHY chip that is configured to send and receive data, as well as provide power. In addition, one of the subset 610*a* of the plurality of ports 610 on the second powering device 1004 that includes a PHY chip that is configured to receive power has been configured as a trunk port and is connected to a cable 1018, and one of the subset 610*b* of the plurality of ports 610 on the second powering device 1004 that includes a PHY chip that is configured to provide power has been configured as a trunk port and is connected to the cable 1014 that is also connected to the one of the subset 610*a* of the plurality of ports 610 on the first powering device 1002 that includes the PHY chip that is configured to receive power. In FIG. 10, an arrow 1014*a* indicates an available power transfer directionality via the cable 1014 from the one of the subset 610*b* of the plurality of ports 610 on the second powering device 1004 to the one of the subset 610a of the plurality of ports 610 on the first powering device 1002. However, as discussed above, the cable 1014 is configured to transfer data in both directions between the first powering device 1002 and the second powering device 1004.

Similarly, the power source connector 608b on the power cable 608a that extends from the third powering device 1006 is coupled to a power source 1012. At least a subset 610c of the plurality of ports 610 on the third powering device 1006 have been configured as access ports and are each coupled via a cable (e.g., an Ethernet cable) to respective powered devices 1006a, 1006b, and 1006c. As discussed below, each of the subset 610c of the plurality of ports 610 on the third powering device 1006 includes a respective PHY chip that is configured to send and receive data, as well as provide power. In addition, one of the subset 610a of the plurality of ports 610 on the third powering device 1006 that includes a PHY chip that is configured to receive power has been configured as a trunk port and is connected to the cable 1016 that is also connected to the one of the subset 610b of the plurality of ports 610 on the first powering device 1002 that includes the PHY chip that is configured to provide power, and one of the subset 610b of the plurality of ports 610 on the third powering device 1006 that includes a PHY chip that is configured to provide power has been configured as a trunk port and is connected to the cable 1018 that is also connected to the one of the subset 610a of the plurality of ports 610 on the second powering device 1004 that includes the PHY chip that is configured to receive power. In FIG. 10, an arrow 1016a indicates an available power transfer directionality via the cable 1016 from the one of the subset 610b of the plurality of ports 610 on the first powering device 1002 to the one of the subset 610a of the plurality of ports 610 on the second powering device 1004, and an arrow 1018a indicates an available power transfer directionality via the cable 1018 from the one of the subset 610b of the plurality of ports 610 on the third powering device 1006 to the one of the subset 610a of the plurality of ports 610 on the second powering device 1004. However, as discussed above, the cables 1016 and 1018 is configured to transfer data in both directions between the second powering device 1004 and the third powering device 1006.

Similarly as in the port data capacities example for the power distribution system 800 described above, in the power distribution system 1000 the first powering device 1002 may be a first networking device that includes a 10 Gigabit Ethernet port that is coupled to a network (e.g., the Internet, not illustrated), and includes 1 Gigabit Ethernet ports as the one of the subset 610a of the plurality of ports 610 and the one of the subset 610b of the plurality of ports 610 on the first networking device; the second powering device 1004 may be a second networking device that includes a 1 Gigabit Ethernet port as the one of the subset 610a of the plurality of ports 610 on the second networking device, and a 1 Gigabit Ethernet port as the one of the subset 610b of the plurality of ports 610 on the second networking device; and the third powering device 1006 may be a third networking device that includes a 1 Gigabit Ethernet port as the one of the subset 610a of the plurality of ports 610 on the third networking device, and a 1 Gigabit Ethernet port as the one of the subset 610b of the plurality of ports 610 on the third networking device. However, as also discussed above, in other embodiments, powering devices may couple to powered devices and/or powering device via multiple ports that are configured to provide power, and powering devices may be coupled to powered devices and/or powering devices by higher capacity ports, enabling levels of power sharing capacity in a variety of manners that would be apparent to one of skill in the art in possession of the present disclosure Similarly as described above, any of the powered devices 1002a-f, 1004a-c, and 1006a-c may be wireless access points, cameras, phones, clocks, security access devices, remote sensors, remote monitoring devices, powered Bluetooth devices, radio frequency identification (RFID) readers, personal digital assistants (PDAs), laptop computers, and/or a variety of other powered devices known in the art. The power sources 1008, 1010, and 1012 may be the same power source, different power sources, and combinations thereof, and may include, for example, power sources that may be connected to through a wall outlet (as illustrated), hardwired power sources, and/or a variety of other power sources known in the art. While the illustrated example provides only three networking switch powering devices coupled together through trunk ports, while being coupled to powered devices through access ports, and being coupled to power sources, more or fewer powering devices, other types of powering devices, more or fewer powered devices, more or fewer power sources, other types of couplings and coupling ports, and/or a wide variety of other modifications to the power distribution system 900 will provide systems that will benefit from the power distribution techniques discussed below and are envisioned as falling within the scope of the present disclosure.

The method 700 then proceeds to decision block 704 where the first powering device determines whether its available power is sufficient to power its powered device(s). While the examples provided below discuss power distribution in the power distribution systems 800, 900, and 1000 from the "point of view" of the first powering devices 802, 902, or 1002, any of the powering devices in the power distribution systems 800, 900, and 1000 may operate according to the method 700 to distribute power in substantially the same manner as discussed below for the first powering device. In an embodiment of block 704, the power distribution engine 606 in the first powering device 802, 902, or 1002 compares the power available through its power system 608 (e.g., via the connection of that power system 608 to the power sources 806, 908, or 1008) to the current power consumption, power requirements, power requests, and/or other power needs of its connected powered devices 802a-f, 902a-d, and 1002a-f, respectively, and determines whether the power available from its power system 608 is sufficient to power each of its powered devices.

In some embodiments, the power distribution engine 606 in the first powering devices 802, 902, or 1002 may determine a power insufficiency amount that is the difference in the amount of power available from its power system 608 and the amount of power consumed, required, requested, or otherwise needed by its powered devices. In other embodiments, the power distribution engine 606 in the first powering devices 802, 902, or 1002 may simply determine that there is a power insufficiency (e.g., that one or more of its powered devices is not receiving enough power, not operating optimally, and/or is otherwise power deficient) without quantifying that power insufficiency. In some embodiment, the determination that there is insufficient power at decision block 704 may include a real time determination of the current power situation (e.g., currently available power vs. current power consumption). In other embodiments, the determination that there is insufficient power at decision block 704 may include a prediction of a future power situation (e.g., expected power availability at a future time vs. predicted power consumption at that future time). While a few examples are provided, any methods for determining a power insufficiency from an available power are envisioned as falling within the scope of the present disclosure.

If, at decision block 704, the power distribution engine 606 in the first powering devices 802, 902, or 1002 determines that the power available from the power system 608 is not sufficient to power one or more its powered devices, the method 700 then proceeds to block 706 where the first powering devices 802, 902, or 1002 request power from second powering device(s). With reference to FIG. 8, in an embodiment, the power distribution engine 606 in the first powering device 802 may communicate, for example, through the one of the subset 610a of the plurality of ports 610 on the first powering device 802 that includes the PHY chip that is configured to receive power and over the link provided by the cable 810 to the one of the subset 610b of the plurality of ports 610 on the second powering device 804 that includes the PHY chip that is configured to provide power, a request for power from the second powering device 804.

With reference to FIG. 9, in an embodiment, the power distribution engine 606 in the first powering device 902 may communicate, for example, through the first of the subset 610a of the plurality of ports 610 on the first powering device 902 that includes the PHY chip that is configured to receive power and over the link provided by the cable 914 to the one of the subset 610b of the plurality of ports 610 on the second powering device 904 that includes the PHY chip that is configured to provide power, a request for power from the second powering device 904. In another embodiment, the first powering device 902 may communicate, for example, through the second of the subset 610a of the plurality of ports 610 on the first powering device 902 that includes the PHY chip that is configured to receive power and over the link provided by the cable 916 to the one of the subset 610b of the plurality of ports 610 on the third powering device 906 that includes the PHY chip that is configured to provide power, a request for power form the third powering device 906. As such, at block 706 the first powering device 902 may request power from either or both of the second powering device 904 and/or the third powering device 906.

With reference to FIG. 10, in an embodiment, the power distribution engine 606 in the first powering device 1002 may communicate, for example, through the one of the subset 610a of the plurality of ports 610 on the first powering device 1002 that includes the PHY chip that is configured to receive power and over the link provided by the cable 1014 to the one of the subset 610b of the plurality of ports 610 on the second powering device 1004 that includes the PHY chip that is configured to provide power, a request for power from the second powering device 1004. In another embodiment, the first powering device 902 may communicate, for example, through the one of the subset 610b of the plurality of ports 610 on the first powering device 902 that includes the PHY chip that is configured to provide power and over the link provided by the cable 1016 to the one of the subset 610a of the plurality of ports 610 on the third powering device 906 that includes the PHY chip that is configured to receive power, a request for power form the third powering device 906. As such, some embodiment of block 706 provide the first powering device 902 requesting power from either or both of the second powering device 904 and/or the third powering device 906. In any of the embodiments discussed above, the request for power at block 706 may be a request for the power insufficiency amount discussed above (e.g., an estimation of an amount of power needed to sufficiently power the powered devices). In other embodiments, the request for power at block 706 may be a request for any surplus power available to the second powering devices 804, 904, or 1004 (and in some embodiments, the third powering devices 906 or 1006).

In some embodiments of the power distribution system 900 of FIG. 9 or the power distribution system 1000 of FIG. 10, the first powering device 902 or 1002 may request power from the third powering device 906 or 1006 in response to determining that the second powering device 904 or 1004 from which power was requested at block 706 does not have enough power to provide to the first powering device 902 or 1002 to sufficiently power its powered device(s). As such, power may be requested by the first powering device from other powering devices based on a priority of those other powering device, based on which of those other powering devices has the highest surplus of power, based on which of those powering device has the fewest powered devices connected to it, etc. In another embodiment, the first powering device 902 or 1002 may request power from the third powering device 906 or 1006 at block 706 in requested power amounts that distribute the power needed by the first powering device 902 or 1002 to power its powered device(s) amongst each of the second powering device 904 or 1004 and the third powering device 906 or 1006 (as well as other powering device connected to the first powering device 902 in non-illustrated embodiments) from which it is requesting power. While a few examples are provided, any methods for requesting power are envisioned as falling within the scope of the present disclosure.

At block 706, upon receiving the request for power from the first powering devices 802, 902, or 1002, the second powering devices 804, 904, or 1004 (and in some embodiments, the third powering devices 906 or 1006) determine whether there is sufficient power available to provide to the first powering devices 802, 902, or 1002, respectively. As discussed in further detail below, in some embodiments of the power distribution system 1000 of FIG. 10, at block 706 the second powering device 1004 may forward the request for power (that was received from the first powering device 1002) to the third powering device 1006, and the third powering device 1006 may determine whether there is sufficient power available to provide to the first powering devices 1002.

Upon the power distribution engine 606 in the second powering devices 804, 904, or 1004 (and in some embodiments, the power distribution engine 606 in the third powering devices 906 or 1006) determining that there is sufficient power available to provide to the first powering devices 802, 902, or 1002, the method 700 proceeds to block 708 where the first powering device receives power from the second powering device (and in some embodiments the third powering device) and provides power to its powered device(s).

Referring to FIG. 8, at block 708 the power distribution engine 606 in the second powering device 804 is configured to provide power from its power system 608 to the first powering device 802 through the one of the subset 610b of the plurality of ports 610 on the second powering device 804 that includes the PHY chip that is configured to provide power, over the link provided by the cable 810, and to the one of the subset 610a of the plurality of ports 610 on the first powering device 802 that includes the PHY chip that is configured to receive power.

Referring to FIG. 9, at block 708 the power distribution engine 606 in the second powering device 904 is configured to provide power from its power system 608 to the first powering device 902 through the one of the subset 610*b* of the plurality of ports 610 on the second powering device 904 that includes the PHY chip that is configured to provide power, over the link provided by the cable 914, and to the first of the subset 610*a* of the plurality of ports 610 on the first powering device 802 that includes the PHY chip that is configured to receive power. In an embodiment, the power distribution engine 606 in the third powering device 906 is configured to provide power from its power system 608 to the first powering device 902 through the one of the subset 610*b* of the plurality of ports 610 on the third powering device 906 that includes the PHY chip that is configured to provide power, over the link provided by the cable 916, and to the second of the subset 610*a* of the plurality of ports 610 on the first powering device 902 that includes the PHY chip that is configured to receive power. As such, at block 708 the first powering device 902 may receive power from either or both of the second power device 904 and/or the third powering device 906.

Referring to FIG. 10, in embodiments where the second powering device 1004 determines that it has sufficient power to the provide to the first powering device 1002, at block 708 the power distribution engine 606 in the second powering device 1004 is configured to provide power from its power system 608 to the first powering device 1002 through the one of the subset 610*b* of the plurality of ports 610 on the second powering device 1004 that includes the PHY chip that is configured to provide power, over the link provided by the cable 1014, and to the one of the subset 610*a* of the plurality of ports 610 on the first powering device 1002 that includes the PHY chip that is configured to receive power. However, in embodiments where the second powering device 1004 determines that it has insufficient power to the provide to the first powering device 1002 but the third powering device 1006 determines that it has sufficient power to the provide to the first powering device 1002, the power distribution engine 606 in the third powering device 1006 is configured to provide power from its power system 608 to the second powering device 1002 through the one of the subset 610*b* of the plurality of ports 610 on the third powering device 1006 that includes the PHY chip that is configured to provide power, over the link provided by the cable 1018, and to the one of the subset 610*a* of the plurality of ports 610 on the second powering device 1004 that includes the PHY chip that is configured to receive power. The power distribution engine 606 in the second powering device 1004 is then configured to provide the power received from the third powering device 1006 to the first powering device 1002 through the one of the subset 610*b* of the plurality of ports 610 on the second powering device 1004 that includes the PHY chip that is configured to provide power, over the link provided by the cable 1014, and to the one of the subset 610*a* of the plurality of ports 610 on the first powering device 1002 that includes the PHY chip that is configured to receive power.

At block 708, the power distribution engine 606 in the first powering devices 802, 902, or 1002 receives that power from the second powering devices 804, 904, or 1004 (and in some embodiments, directly from the third powering device 906 or indirectly from the third powering device 1006 through the second powering device 1004), and provides that power to the powered devices for which it was determined there was insufficient power available at decision block 704. The first powering devices 802, 902, or 1002 may then operate to receive power from the second powering devices 804, 904, or 1004 (and in some embodiments, directly from the third powering device 906 or indirectly from the third powering device 1006 through the second powering device 1004) and provide that power to one or more of its powered devices until the power distribution engine 606 determines that the power available through the power system 608 in the first powering devices 802, 902, or 1002 is sufficient to power each of its powered devices.

For example, upon determining that the power available through the power system 608 is sufficient to power each of its powered devices, the power distribution engine 606 in the first powering devices 802, 902, or 1002 may send a signal to the power distribution engine 606 in the second powering devices 804, 904, or 1004 (and in some embodiments, the third powering devices 906 or 1006) to cease providing power via its port that includes the PHY chip that is configured to provide power and that is connected via a cable to the port on the first powering device that is configured to receive power. In embodiments in which the other powering device are not able to provide enough power to the first powering devices 802, 902, or 1002 to sufficiently power all of their powered devices, any surplus power available to those other powered devices may be received and provisioned to powered devices by the first powering devices 802, 902, or 1002 in order to sufficiently power as many of the powered device as possible (e.g., using a priority scheme that prioritizes the powered devices relative to each other).

Thus, the first powering devices 802, 902, or 1002 may determine that their available power (e.g., through their power systems 608) is insufficient to power one or more of their powered devices (e.g., due to a spike in power use by the powering devices 802, 902, or 1002 and/or any of their respective powered devices), and may then request and receive power from one or more connected powering devices and use that power to ensure that each of their powered devices receives sufficient power. While only the first powering devices 802, 902, or 1002 are described as requesting and receiving power at blocks 706 and 708, any of the powering devices in the power distribution systems 800, 900, and 1000 may operate to request and receive power in substantially the same manner as discussed above. As such, power may be allocated throughout the power distribution systems 800, 900, and 1000 from powering devices that have a surplus of power to powering devices that are running (or about to run) at a power deficit.

If, at decision block 704, it is determined that there is sufficient power available to the first powering device to power each of its powered devices, the method 700 may proceed to decision block 710 where it is determined whether the first powering device has received a request for power from third powering device(s). Referring now to FIG. 8, in an embodiment of decision block 710, the power distribution engine 606 in the first powering device 802 may determine whether a request for power has been received that was sent from the second powering device 804 through, for example, the one of the subset 610*a* of the plurality of ports 610 on the second powering device 804 that includes the PHY chip that is configured to receive power, over the link provided by the cable 812, and to the one of the subset 610*b* of the plurality of ports 610 on the first powering device 802 that includes the PHY chip that is configured to provide power.

Referring now to FIG. 9, in an embodiment of decision block 710, the power distribution engine 606 in the first powering device 902 may determine whether a request for power has been received that was sent from the second powering device 904 through, for example, the one of the subset 610*a* of the plurality of ports 610 on the second powering device 904 that includes the PHY chip that is configured to receive power, over the link provided by the cable 920, and to the second of the subset 610*b* of the plurality of ports 610 on the first powering device 902 that includes the PHY chip that is configured to provide power. In another embodiment, the power distribution engine 606 in the first powering device 902 may determine whether a request for power has been received that was sent from the third powering device 906 through, for example, the one of the subset 610*a* of the plurality of ports 610 on the third powering device 906 that includes the PHY chip that is configured to receive power, over the link provided by the cable 918, and to the first of the subset 610*b* of the plurality of ports 610 on the first powering device 902 that includes the PHY chip that is configured to provide power.

Referring now to FIG. 10, in an embodiment of decision block 710, the power distribution engine 606 in the first powering device 1002 may determine whether a request for power has been received that was sent from the third powering device 1006 through, for example, the one of the subset 610*a* of the plurality of ports 610 on the third powering device 1006 that includes the PHY chip that is configured to receive power, over the link provided by the cable 1016, and to the one of the subset 610*b* of the plurality of ports 610 on the first powering device 1002 that includes the PHY chip that is configured to provide power. In another embodiment, the power distribution engine 606 in the first powering device 1002 may determine whether a request for power has been received that was sent from the second powering device 1004 through, for example, the one of the subset 610*b* of the plurality of ports 610 on the second powering device 1004 that includes the PHY chip that is configured to provide power, over the link provided by the cable 1014, and to the one of the subset 610*a* of the plurality of ports 610 on the first powering device 1002 that includes the PHY chip that is configured to receive power.

If at decision block 710, the first powering device determines that a request for power has been received from the third powering device(s), the method 700 proceeds to decision block 712 where it is determined whether power available to the first powering device is sufficient to provide power to the third powering device(s). In an embodiment of decision block 712, the power distribution engine 606 in the first powering devices 802, 902, or 1002 may determine a surplus power amount that is available through its power system 608 and that is not being used by the first powering devices 802, 902, or 1002 or their powered devices. In other embodiments, the power distribution engine 606 in the first powering devices 802, 902, or 1002 may simply determine that there is a power surplus (e.g., that each of its powered devices is receiving full power, that there is unused power available from the power system 608, etc.) without quantifying that power surplus. In some embodiments of the power distribution system 1000 of FIG. 10, at block 712, the first powering device 1002 may forward the request for power (that was received from the second powering device 1004 or third powering device 1006) to another powering device, and that powering device may determine whether there is sufficient power available to provide to the powering devices that requested the power.

In an embodiment, the request received at decision block 710 from each of the third powering device(s) may include a power insufficiency amount that may be an amount of power needed by that third powering device to sufficiently power each of its powered devices, and the power distribution engine 606 in the first powering devices 802, 902, or 1002 may determine whether its power surplus is sufficient to provide power to the third powering device(s). For example, the power distribution engine 606 in the first powering devices 802, 902, or 1002 may determine whether its power surplus is greater than or equal to a power insufficiency amount that was requested by the third powering device(s). In another example, the power distribution engine 606 in the first powering devices 802, 902, or 1002 may simply determine that it has a power surplus, all of which is available to provide to the third powering device(s), regardless of whether or not that power surplus is greater than or equal to a power insufficiency amount that was requested by the third powering device(s).

If, at decision block 712, the power distribution engine 606 in the first powering devices 802, 902, or 1002 determines that there is sufficient power available to provide power to the third powering device(s), the method 700 proceeds to block 714 where power is provided to the third powering device(s). Referring to FIG. 8, at block 714, the power distribution engine 606 in the first powering device 802 may provide power from its power system 608 to the second powering device 804 through the one of the subset 610*b* of the plurality of ports 610 on the first powering device 802 that includes the PHY chip that is configured to provide power, over the link provided by the cable 812, and to the one of the subset 610*a* of the plurality of ports 610 on the second powering device 804 that includes the PHY chip that is configured to receive power.

Referring to FIG. 9, at block 714, the power distribution engine 606 in the first powering device 902 may provide power from its power system 608 to the second powering device 902 through the second of the subset 610*b* of the plurality of ports 610 on the first powering device 902 that includes the PHY chip that is configured to provide power, over the link provided by the cable 920, and to the one of the subset 610*a* of the plurality of ports 610 on the second powering device 804 that includes the PHY chip that is configured to receive power. In another embodiment of block 714, the power distribution engine 606 in the first powering devices 802 may provide power from its power system 608 to the third powering device 906 through the first of the subset 610*b* of the plurality of ports 610 on the first powering device 902 that includes the PHY chip that is configured to provide power, over the link provided by the cable 918, and to the one of the subset 610*a* of the plurality of ports 610 on the third powering device 906 that includes the PHY chip that is configured to receive power. As such, at block 714 the first powering device 902 may provide power to either or both of the second power device 904 and/or the third powering device 906.

Referring to FIG. 10, in embodiments where the first powering device 1002 determines that it has sufficient power to the provide to the third powering device 1006, the power distribution engine 606 in the first powering device 1002 is configured to provide power from its power system 608 to the third powering device 1006 through the one of the subset 610*b* of the plurality of ports 610 on the first powering device 1002 that includes the PHY chip that is configured to provide power, over the link provided by the cable 1016, and to the one of the subset 610*a* of the plurality of ports 610 on the third powering device 1006 that includes the PHY chip that is configured to receive power.

Referring to FIG. 8, at block 714 the power distribution engine 606 in the first powering device 802 may provide any or all of its power surplus to the second powering device 804. For example, the first powering device 802 may provide an amount of its power surplus that is equal to a power insufficiency amount requested by the second powering device 804. In another example, the first powering device 802 may provide all of its power surplus to the second powering device 804. The first powering device 802 may then operate to provide power to the second powering device 804 for distribution to one or more of its powered devices 804*a-c* until the power distribution engine 606 in the third second powering device 804 determines that the power available through its power system 608 is sufficient to power each of its powered devices 804*a-c*. For example, upon determining that the power available through its power system 608 is sufficient to power each of its powered devices 804*a-c*, the power distribution engine 606 in the second powering device 804 may send a signal to the power distribution engine 606 in the first powering device 802 to cease providing power through the one of the subset 610*b* of the plurality of ports 610 on the first powering device 802 that includes the PHY chip that is configured to provide power, over the link provided by the cable 812, and to the one of the subset 610*a* of the plurality of ports 610 on the second powering device 804 that includes the PHY chip that is configured to receive power.

Referring to FIG. 9, at block 714 the power distribution engine 606 in the first powering device 902 may provide any or all of its power surplus to the second powering device 904 and/or the third powering device 906. For example, the first powering device 902 may provide an amount of its power surplus that is equal to a power insufficiency amount requested by the second powering device 904 and/or the third powering device 906. In another example, the first powering device 902 may provide all of their power surplus to the second powering device 904 and/or the third powering device 906. The first powering device 902 may then operate to provide power to the second powering device 904 and/or the third powering device 906 for distribution to one or more of their powered devices until the power distribution engines 606 in the second powering device 904 and/or the third powering device 906 determine that the power available through its power system 608 is sufficient to power each of its powered devices. For example, upon determining that the power available through its power system 608 is sufficient to power each of its powered devices, the power distribution engine 606 in the second powering device 904 and/or the third powering device 906 may send a signal to the power distribution engine 606 in the first powering device 902 to cease providing power through the first and/or the second of the subset 610*b* of the plurality of ports 610 on the first powering device 802 that includes the PHY chip that is configured to provide power, over the links provided by the cable 918 and/or the cable 920, and to the one of the subset 610*a* of the plurality of ports 610 on the second powering device 904 and/or the third powering device 906 that includes the PHY chip that is configured to receive power.

Referring to FIG. 10, at block 714 the power distribution engine 606 in the first powering device 1002 may provide any or all of its power surplus and/or any or all of the surplus power received from the second powering device 1006 to the third powering device 1006. For example, the first powering device 902 may provide an amount of its power surplus and/or the surplus power received from the second powering device 1006 that is equal to a power insufficiency amount requested by the third powering device 1004. In another example, the first powering device 1002 may provide all of its power surplus and/or all of the surplus power received from the second powering device 1006 to the third powering device 1006. The first powering device 1002 may then operate to provide or pass power to the third powering device 1006 for distribution to one or more of its powered devices 1006*a-c* until the power distribution engine 606 in the third powering device 1006 determines that the power available through its power system 608 is sufficient to power each of its powered devices 1006*a-c*. For example, upon determining that the power available through its power system 608 is sufficient to power each of its powered devices 1006*a-c*, the power distribution engine 606 in the third powering device 1006 may send a signal to the power distribution engine 606 in the first powering device 1002 to cease providing power through the one of the subset 610*b* of the plurality of ports 610 on the first powering device 1002 that includes the PHY chip that is configured to provide power, over the link provided by the cable 1016, and to the one of the subset 610*a* of the plurality of ports 610 on the third powering device 1006 that includes the PHY chip that is configured to receive power. In some of those embodiments, the first powering device 1002 may then inform the second powering device 1004 to stop provisioning any power for the third powering device 1006.

In the event that powering device are not able to provide enough power to the third powering device(s) to sufficiently power all of its powered devices, any surplus power available to the other powered devices may be received and provisioned to its powered devices by the third powering device(s) in order to sufficiently power as many of its powered device as possible (e.g., using a priority scheme that prioritizes the powered devices relative to each other).

If, at decision block 712, the power distribution engine 606 in the first powering devices 902 or 1002 determines that there is not sufficient power available to provide power to the third powering device(s), the method 700 may proceed to block 716 where the first powering devices 902 or 1002 request power from second powering device(s). With reference to FIG. 9, at decision block 712, the power distribution engine 606 in the first powering device 902 may determine that there is no power surplus available to provide to the third powering device 906, or that the power surplus available to provide to the third powering device 906 is insufficient to sufficiently power the powered devices 906*a-c* connected to the third powering device 906 (e.g., based on a power insufficiency amount received from the third powering device 906.) In embodiments where the request for power was received from the third powering device 906 at block 710, the power distribution engine 606 in the first powering device 902 may then communicate, through the first of the subset 610*a* of the plurality of ports 610 on the first powering device 902 that includes the PHY chip that is configured to receive power over the link provided by the cable 914 and to the one of the subset 610*b* of the plurality of ports 610 on the second powering device 904 that includes the PHY chip that is configured to provide power, a request for power from the second powering device 904. In another embodiment, the power distribution engine 606 in the first powering device 902 may communicate, through the second of the subset 610*a* of the plurality of ports 610 on the first powering device 902 that includes the PHY chip that is configured to receive power over the link provided by the cable 916 and to the one of the subset 610*b* of the plurality of ports 610 on the third powering device 906 that includes the PHY chip that is configured to provide power, a request for power from the third powering device 906. As such, the first powering device 902 may request power from either or both of the second power device 904 and/or the third powering device 906 at block 716.

With reference to FIG. 10, in some embodiments of block 716, the first powering device 1002 may determines that it has insufficient power to the provide to the third powering device 1006 but the second powering device 1004 may determine that it has sufficient power to the provide to the third powering device 1006. As such, in embodiments of the power distribution system 1000 illustrated in FIG. 10, block 716 may be performed when the first powering device 1002 forwards the request for power that was received from the third powering device 1006 to the second powering device 1004, along with the determination by the second powering device 1004 of whether there is sufficient power to provide to the third powering device 1006.

In some embodiments, the request for power sent by the first powering devices 902 or 1002 at block 716 may be a request for the power insufficiency amount received from the third powering device(s). In other embodiments, the request for power sent by the first powering devices 902 or 1002 at block 716 may be a request for a power amount that is the difference between the power surplus available to the first powering devices 902 or 1002 and a power insufficiency amount requested by the third powering device(s). In yet other embodiments, the request for power sent by the first powering devices 902 or 1002 at block 716 may be a request for any surplus power available. While a few examples are provided, any methods for requesting power are envisioned as falling within the scope of the present disclosure.

The method 700 then proceeds to block 718 where power received by the first powering device is provided to the third powering device(s). Referring now to FIG. 9, in an embodiment of block 718, the power distribution engine 606 in the second powering devices 904 is configured to provide power from its power system 608 to the first powering device 902 through the one of the subset 610b of the plurality of ports 610 on the second powering device 904 that includes the PHY chip that is configured to provide power, over the link provided by the cable 914, and to the first of the subset 610a of the plurality of ports 610 on the first powering device 902 that includes the PHY chip that is configured to receive power. The power distribution engine 606 in the first powering device 902 is configured to then provide the power received from the second powering device 904 to the third powering device 906 through the first of the subset 610b of the plurality of ports 610 on the first powering device 902 that includes the PHY chip that is configured to provide power, over the link provided by the cable 918, and to the one of the subset 610a of the plurality of ports 610 on the third powering device 906 that includes the PHY chip that is configured to receive power.

In another embodiment of block 718, the power distribution engine 606 in the third powering device 906 is configured to provide power from its power system 608 to the first powering device 902 through the one of the subset 610b of the plurality of ports 610 on the third powering device 906 that includes the PHY chip that is configured to provide power, over the link provided by the cable 916, and to the second of the subset 610a of the plurality of ports 610 on the first powering device 902 that includes the PHY chip that is configured to receive power. The power distribution engine 606 in the first powering device 902 is configured to then provide the power received from the third powering device 906 to the second powering device 904 through the second of the subset 610b of the plurality of ports 610 on the first powering device 902 that includes the PHY chip that is configured to provide power, over the link provided by the cable 920, and to the one of the subset 610a of the plurality of ports 610 on the second powering device 904 that includes the PHY chip that is configured to receive power.

Referring to FIG. 10, the power distribution engine 606 in the second powering device 1004 is configured to provide power from its power system 608 to the first powering device 1002 through the one of the subset 610b of the plurality of ports 610 on the second powering device 1004 that includes the PHY chip that is configured to provide power, over the link provided by the cable 1014, and to the one of the subset 610a of the plurality of ports 610 on the first powering device 1002 that includes the PHY chip that is configured to receive power. The power distribution engine 606 in the first powering devices 1002 is then configured to provide the power received from the second powering device 1004 to the third powering device 1006 through the one of the subset 610b of the plurality of ports 610 on the first powering device 1002 that includes the PHY chip that is configured to provide power, over the link provided by the cable 1016, and to the one of the subset 610a of the plurality of ports 610 on the third powering device 1006 that includes the PHY chip that is configured to receive power. The first powering device 1002 may provide power to the second powering device 1004 through the third powering device 1006 in a similar manner.

Thus, a first powering device may provide surplus power that is available through its power system via low-cost, commodity, PHY chips that are only configured to transmit power in a single direction, and to connected powering device(s) for use in ensuring that each of the powered devices coupled to those connected powering device(s) receive sufficient power. Furthermore, the first powering device may pass surplus power that is available from second powering device(s) via low-cost, commodity, PHY chips to third powering device for use in ensuring that each of the powered devices coupled to that third powering device receive sufficient power. As discussed above, any second powering device or third powering device discussed above may operate as described to provide power (directly or as an intermediary) to the first powering device (or other connected powering devices, not illustrated) substantially similarly as described above for the first powering device. As such, power may be allocated throughout the power distribution system from powering devices that have a surplus of power to powering devices that are running (or about to run) at a deficit.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Information Handling System (HIS), comprising:
   a chassis;
   a plurality of ports that are located on the chassis, wherein each of a first port and a second port of the plurality of ports are configured to both send and receive data and provide power, and a third port of the plurality of ports is configured to both send and receive data and receive power; and
   a power distribution engine that is included in the chassis and that is coupled to each of the plurality of ports, wherein the power distribution engine is configured to:
      determine that power available to the power distribution engine is insufficient to power a powered device that is coupled to the first port;
      send, through the third port, data that includes a request for power from a first powering device that is coupled to the third port and that is not providing power through the third port prior to the sending of the request through the third port;

receive, through the third port subsequent to the sending of the request through the third port, power from the first powering device;

provide, through the first port to the powered device, power that is received through the third port from the first powering device; and send and receive, through the first port, data with the powered device.

2. The IHS of claim 1, wherein the first port is configured as an access port, and wherein each of the second port and the third port are configured as trunk ports.

3. The IHS of claim 1, further comprising:

a power system that is included in the chassis and that is coupled to the power distribution engine, wherein the power system is configured to couple to a power source that is separate from the powering devices and provide power to the power distribution engine, and wherein the power distribution engine is configured to:

determine that power available from the power system is insufficient to power the powered device that is coupled to the first port.

4. The IHS of claim 1, wherein the power distribution engine is configured to:

receive, through the second port, data that includes a request for power from a second powering device that is coupled to the second port and to which power is not being provided through the second port prior to receiving the request through the second port;

determine that power available to the power distribution engine is sufficient to provide power through the second port to the second powering device; and provide, through the second port subsequent to the receiving of the request through the second port, power to the second powering device.

5. The IHS of claim 1, wherein the power distribution engine is configured to:

receive, through the second port, data that includes a request for power from the first powering device that is coupled to the second port and to which power is not being provided through the second port prior to the receiving of the request through the second port;

determine that power available to the power distribution engine is sufficient to provide power through the second port to the first powering device; and provide, through the second port subsequent to receiving the request through the second port, power to the first powering device.

6. The IHS of claim 5, further comprising:

a fourth port of the plurality of ports that is configured to both send and receive data and receive power, wherein the power distribution engine is configured to:

determine, in response to receiving the request for power from the first powering device through the second port, that power available to the power distribution engine is insufficient to provide power to the first powering device;

send, through the fourth port to a second powering device that is coupled to the fourth port and that is not providing power through the fourth port prior to the sending of the request through the fourth port, data that is based on the request for power that was received from the first powering device;

receive, through the fourth port subsequent to the sending of the data through the fourth port, power from the second powering device; and provide, through the second port to the first powering device, power that is received through the fourth port from the second powering device.

7. A power distribution system, comprising:

a powered device;

a first networking switch device;

a second networking switch device that includes a first port that is coupled to the powered device and that is configured to both send and receive data and provide power, a second port that is configured to both send and receive data and provide power, and a third port that is configured to both send and receive data and receive power, wherein the second networking switch device is configured to: determine that power available to the second networking switch device is insufficient to power the powered device through the first port;

send, through the third port, data that includes a request for power from the first networking switch device that is coupled to the third port and that is not providing power through the third port prior to the sending of the request through the third port;

receive, through the third port subsequent to the sending of the request through the third port, power from the first networking switch device;

provide, through the first port to the powered device, power that is received through the third port from the first networking switch device; and send and receive, through the first port, data with the powered device.

8. The power distribution system of claim 7, wherein the first port is configured as an access port, and wherein each of the second port and the third port are configured as trunk ports.

9. The power distribution system of claim 7, further comprising:

a power system that is included in the second networking switch device and that is configured to couple to a power source that is separate from the first networking switch device and the second networking switch device and provide power to the second networking switch device, and wherein the second networking switch device is configured to:

determine that power available from the power system is insufficient to power the powered device through the first port.

10. The power distribution system of claim 7, further comprising:

a third networking switch device, wherein the second networking switch device is configured to:

receive, through the second port, data that includes a request for power from the third networking switch device that is coupled to the second port and to which power is not being provided through the second port prior to receiving the request through the second port;

determine that power available to the second networking switch device is sufficient to provide power through the second port to the third networking switch device; and provide, through the second port subsequent to the receiving of the request through the second port, power to the third networking switch device.

11. The power distribution system of claim 7, wherein the second networking switch device is configured to:

receive, through the second port, data that includes a request for power from the first networking switch device that is coupled to the second port and to which power is not being provided through the second port prior to the receiving of the request through the second port;

determine that power available to the second networking switch device is sufficient to provide power through the second port to the first networking switch device; and provide, through the second port subsequent to receiving the request through the second port, power to the first networking switch device.

12. The power distribution system of claim 11, further comprising:

a third networking switch device, wherein the second networking switch device includes a fourth port that is configured to both send and receive data and receive power, wherein the second networking switch device is configured to:

determine, in response to receiving the request for power from the first powering device through the second port, that power available to the power distribution engine is insufficient to provide power to the first networking switch device;

send, through the fourth port to the third networking switch device that is coupled to the fourth port and that is not providing power through the fourth port prior to the sending of the request through the fourth port, data that based on the request for power from the first networking switch device;

receive, through the fourth port subsequent to the sending of the data through the fourth port, power from the third networking switch device; and provide, through the second port to the first networking switch device, power that is received through the fourth port from the third networking switch device.

13. The IHS of claim 7, wherein the second port and the third port are each coupled to the first networking switch device and configured as a Link Aggregation Group (LAG).

14. A method for distributing power, comprising:

determining, by a first powering device, that power available to the first powering device is insufficient to power a powered device that is coupled to a first port on the first powering device that is configured to send and receive data and provide power;

sending, by the first powering device through a second port on the first powering device that is configured to send and receive data and receive power, data that includes a request for power from a second powering device that is coupled to the second port and that is not providing power through the second port prior to the sending of the request through the second port;

receiving, by the first powering device through the second port subsequent to the sending of the request through the second port, power from the second powering device;

providing, by the first powering device through the first port to the powered device, power that is received through the second port from the second powering device; and sending and receiving, by the first powering device through the first port, data with the powered device.

15. The method of claim 14, wherein the first port is configured as an access port, and wherein the second port is configured as a trunk port.

16. The method of claim 14, wherein the determining that power available to the first powering device is insufficient to power the powered device that is coupled to a first port includes:

determining, by the first powering device, that power available from a power system that is included in the first powering device and that is coupled to a power source that is separate from the first powering device and the second powering device is insufficient to power the powered device that is coupled to the first port.

17. The method of claim 14, further comprising:

receiving, by the first powering device through a third port on the first powering device that is configured to send and receive data and provide power, data that includes a request for power from a third powering device that is coupled to the third port and to which power is not being provided through the third port prior to receiving the request through the third port;

determining, by the first powering device, that power available to the first powering device is sufficient to provide power through the third port to the third powering device; and providing, by the first powering device through the third port subsequent to the receiving of the request through the third port, power to the third powering device.

18. The method of claim 14, further comprising:

receiving, by the first powering device through a third port on the first powering device that is configured to send and receive data and provide power, data that includes a request for power from the second powering device that is coupled to the third port and to which power is not being provided through the third port prior to the receiving of the request through the third port;

determining, by the first powering device, that power available to the first powering device is sufficient to provide power through the third port to the second powering device; and providing, by the first powering device through the third port subsequent to receiving the request through the third port, power to the second powering device.

19. The method of claim 18, further comprising:

determining, by the first powering device in response to receiving the request for power from the second powering device through the third port, that power available to the first powering device is insufficient to provide power to the second powering device;

sending, by the first powering device through a fourth port on the first powering device that is configured to send and receive data and receive power, data to a third powering device that is coupled to the fourth port and that is not providing power through the fourth port prior to the sending of the data through the fourth port, wherein the data is based on the request for power that was received from the second powering device;

receiving, by the first powering device through the fourth port subsequent to the sending of the data through the fourth port, power from the third powering device; and providing, by the first powering device through the third port to the second powering device, power that is received through the fourth port from the third powering device.

20. The method of claim 18, wherein the second port and the third port are configured as a Link Aggregation Group (LAG).

* * * * *